United States Patent
Rosenberg et al.

(10) Patent No.: US 9,244,562 B1
(45) Date of Patent: Jan. 26, 2016

(54) GESTURES AND TOUCHES ON FORCE-SENSITIVE INPUT DEVICES

(75) Inventors: Ilya D. Rosenberg, Mountain View, CA (US); Julien G. Beguin, San Francisco, CA (US); Kenneth H Perlin, New York, NY (US); Tomer Moscovich, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 848 days.

(21) Appl. No.: 12/846,268

(22) Filed: Jul. 29, 2010

Related U.S. Application Data

(60) Provisional application No. 61/230,592, filed on Jul. 31, 2009.

(51) Int. Cl.
| | |
|---|---|
| *G06F 3/041* | (2006.01) |
| *G06F 3/048* | (2013.01) |
| *G06F 3/0484* | (2013.01) |
| *G06F 3/0486* | (2013.01) |
| *G06F 3/0488* | (2013.01) |

(52) U.S. Cl.
CPC ............ *G06F 3/0414* (2013.01); *G06F 3/0486* (2013.01); *G06F 3/04845* (2013.01); *G06F 3/04847* (2013.01); *G06F 3/04883* (2013.01); G06F 2203/04808 (2013.01)

(58) Field of Classification Search
CPC .............. G06F 3/0414; G06F 3/04845; G06F 3/04847; G06F 3/0486; G06F 3/04883; G06F 2203/04808
USPC .......................... 345/173, 174; 715/863, 864; 178/18.05–18.06
See application file for complete search history.

(56) References Cited

U.S. PATENT DOCUMENTS

| | | |
|---|---|---|
| 3,944,740 A | 3/1976 | Murase et al. |
| 4,526,043 A | 7/1985 | Boie et al. |
| 4,587,378 A | 5/1986 | Moore |
| 4,952,031 A | 8/1990 | Tsunoda et al. |
| 4,983,786 A | 1/1991 | Stevens et al. |
| 5,105,548 A | 4/1992 | Fowler |

(Continued)

FOREIGN PATENT DOCUMENTS

| | | | |
|---|---|---|---|
| JP | 09282100 A | * | 10/1997 |
| WO | WO2007/141566 A2 | | 12/2007 |

(Continued)

OTHER PUBLICATIONS

Moscovich, et al., "Multi-finger Cursor Techniques", Department of Computer Science, Brown University, Year of Publication: 2006, 7 pages.

(Continued)

*Primary Examiner* — Kumar Patel
*Assistant Examiner* — Afroza Chowdhury
(74) *Attorney, Agent, or Firm* — Lee & Hayes, PLLC

(57) ABSTRACT

A force-sensitive touch sensor detects location and force of touches applied to the sensor. Movement of an object touching the force-sensitive touch sensor correlates to movement of a pointer on a display device. Varying levels of force applied to the force-sensitive touch sensor are interpreted as different commands. Objects displayed on the display device can be manipulated by a combination of gestures across a surface of the force-sensitive touch sensor and changes in force applied to the force-sensitive touch sensor.

55 Claims, 16 Drawing Sheets

(56) References Cited

U.S. PATENT DOCUMENTS

| | | | |
|---|---|---|---|
| 5,543,589 A | 8/1996 | Buchana et al. | |
| 5,597,183 A | 1/1997 | Johnson | |
| 5,666,113 A * | 9/1997 | Logan | 345/173 |
| 5,761,485 A | 6/1998 | Munyan | |
| 5,818,430 A | 10/1998 | Heiser | |
| 5,825,352 A | 10/1998 | Bisset et al. | |
| 5,847,698 A | 12/1998 | Reavey et al. | |
| 6,072,474 A * | 6/2000 | Morimura et al. | 345/173 |
| 6,128,007 A * | 10/2000 | Seybold | 345/174 |
| 6,229,502 B1 | 5/2001 | Schwab | |
| 6,392,636 B1 | 5/2002 | Ferrari et al. | |
| 6,594,606 B2 | 7/2003 | Everitt | |
| 6,707,438 B1 | 3/2004 | Ishizuka et al. | |
| 6,762,752 B2 | 7/2004 | Perski et al. | |
| 6,980,202 B2 | 12/2005 | Carro | |
| 6,982,699 B1 | 1/2006 | Lenssen et al. | |
| 7,123,243 B2 | 10/2006 | Kawasaki et al. | |
| 7,166,966 B2 | 1/2007 | Naugler, Jr. et al. | |
| 7,190,348 B2 | 3/2007 | Kennedy et al. | |
| 7,199,322 B2 | 4/2007 | Bourdelais et al. | |
| 7,324,093 B1 | 1/2008 | Gettemy et al. | |
| 7,339,577 B2 | 3/2008 | Sato et al. | |
| 7,619,616 B2 * | 11/2009 | Rimas Ribikauskas et al. | 345/173 |
| 7,760,187 B2 | 7/2010 | Kennedy | |
| 7,800,586 B2 * | 9/2010 | Serban et al. | 345/173 |
| 7,825,905 B2 * | 11/2010 | Philipp | 345/173 |
| 8,089,470 B1 * | 1/2012 | Schediwy et al. | 345/173 |
| 8,223,278 B2 | 7/2012 | Kim et al. | |
| 8,243,424 B1 | 8/2012 | Babu et al. | |
| 8,265,717 B2 | 9/2012 | Gorsica et al. | |
| 8,316,324 B2 | 11/2012 | Boillot | |
| 8,427,424 B2 * | 4/2013 | Hartmann et al. | 345/156 |
| 8,466,880 B2 | 6/2013 | Westerman et al. | |
| 8,558,767 B2 | 10/2013 | Kwon | |
| 2001/0013855 A1 | 8/2001 | Fricker et al. | |
| 2002/0015024 A1 | 2/2002 | Westerman et al. | |
| 2002/0080123 A1 | 6/2002 | Kennedy et al. | |
| 2002/0149572 A1 | 10/2002 | Schulz et al. | |
| 2002/0180714 A1 | 12/2002 | Duret | |
| 2003/0067449 A1 | 4/2003 | Yoshikawa et al. | |
| 2003/0095115 A1 | 5/2003 | Brian et al. | |
| 2003/0156098 A1 * | 8/2003 | Shaw et al. | 345/163 |
| 2003/0210235 A1 | 11/2003 | Roberts | |
| 2003/0234768 A1 | 12/2003 | Rekimoto et al. | |
| 2004/0125087 A1 | 7/2004 | Taylor et al. | |
| 2004/0174324 A1 | 9/2004 | Yamazaki et al. | |
| 2005/0083316 A1 | 4/2005 | Brian et al. | |
| 2005/0162402 A1 | 7/2005 | Watanachote | |
| 2005/0174336 A1 | 8/2005 | Nakayama et al. | |
| 2005/0200798 A1 | 9/2005 | Tanaka | |
| 2005/0259087 A1 * | 11/2005 | Hoshino et al. | 345/173 |
| 2006/0012580 A1 | 1/2006 | Perski et al. | |
| 2006/0028459 A1 * | 2/2006 | Underwood et al. | 345/179 |
| 2006/0050062 A1 | 3/2006 | Ozawa et al. | |
| 2006/0097991 A1 | 5/2006 | Hotelling et al. | |
| 2006/0109252 A1 | 5/2006 | Kolmykov-Zotov et al. | |
| 2006/0192726 A1 | 8/2006 | Huitema et al. | |
| 2006/0198080 A1 | 9/2006 | Hawes et al. | |
| 2006/0209045 A1 | 9/2006 | Su et al. | |
| 2006/0236263 A1 * | 10/2006 | Bathiche et al. | G06F 3/016 715/786 |
| 2006/0244735 A1 | 11/2006 | Wilson | |
| 2006/0293864 A1 | 12/2006 | Soss | |
| 2007/0128948 A1 | 6/2007 | Nakanishi et al. | |
| 2007/0152976 A1 | 7/2007 | Townsend et al. | |
| 2007/0235231 A1 | 10/2007 | Loomis et al. | |
| 2007/0236618 A1 | 10/2007 | Maag et al. | |
| 2007/0262246 A1 | 11/2007 | Pittel et al. | |
| 2008/0018608 A1 | 1/2008 | Serban et al. | |
| 2008/0018611 A1 | 1/2008 | Serban et al. | |
| 2008/0053293 A1 * | 3/2008 | Georges et al. | 84/609 |
| 2008/0074400 A1 | 3/2008 | Gettemy et al. | |
| 2008/0143679 A1 * | 6/2008 | Harmon et al. | 345/173 |
| 2008/0158183 A1 | 7/2008 | Hotelling et al. | |
| 2008/0160656 A1 | 7/2008 | Chanda et al. | |
| 2008/0168403 A1 | 7/2008 | Westerman et al. | |
| 2008/0180406 A1 * | 7/2008 | Han et al. | 345/173 |
| 2008/0211796 A1 | 9/2008 | Kim | |
| 2008/0246723 A1 | 10/2008 | Baumbach | |
| 2008/0254822 A1 | 10/2008 | Tilley | |
| 2008/0296073 A1 | 12/2008 | McDermid | |
| 2008/0303799 A1 * | 12/2008 | Schwesig et al. | 345/173 |
| 2009/0102805 A1 | 4/2009 | Meijer et al. | |
| 2009/0120696 A1 | 5/2009 | Hayakawa et al. | |
| 2009/0165296 A1 | 7/2009 | Carmi | |
| 2009/0174679 A1 | 7/2009 | Westerman | |
| 2009/0218310 A1 | 9/2009 | Zu et al. | |
| 2009/0219258 A1 | 9/2009 | Geaghan et al. | |
| 2009/0227295 A1 * | 9/2009 | Kim | 455/566 |
| 2009/0237374 A1 | 9/2009 | Li et al. | |
| 2009/0256817 A1 | 10/2009 | Perlin et al. | |
| 2009/0289914 A1 | 11/2009 | Cho | |
| 2009/0309616 A1 | 12/2009 | Klinghult et al. | |
| 2010/0005427 A1 | 1/2010 | Zhang et al. | |
| 2010/0006350 A1 | 1/2010 | Elias | |
| 2010/0013797 A1 | 1/2010 | Kim et al. | |
| 2010/0020043 A1 | 1/2010 | Park et al. | |
| 2010/0026647 A1 * | 2/2010 | Abe et al. | 345/173 |
| 2010/0039395 A1 | 2/2010 | Nurmi et al. | |
| 2010/0090964 A1 | 4/2010 | Soo et al. | |
| 2010/0117974 A1 | 5/2010 | Joguet et al. | |
| 2010/0123670 A1 | 5/2010 | Philipp | |
| 2010/0139990 A1 | 6/2010 | Westerman et al. | |
| 2010/0182285 A1 | 7/2010 | Tremblay | |
| 2010/0199221 A1 | 8/2010 | Yeung et al. | |
| 2010/0267421 A1 | 10/2010 | Rofougaran | |
| 2010/0277439 A1 | 11/2010 | Charlier et al. | |
| 2010/0295780 A1 | 11/2010 | Vaisanen et al. | |
| 2010/0295781 A1 | 11/2010 | Alameh et al. | |
| 2011/0007021 A1 | 1/2011 | Bernstein et al. | |
| 2011/0037709 A1 | 2/2011 | Cottarel et al. | |
| 2011/0061947 A1 | 3/2011 | Krah et al. | |
| 2011/0096033 A1 | 4/2011 | Ko | |
| 2011/0109577 A1 | 5/2011 | Lee et al. | |
| 2011/0242037 A1 | 10/2011 | Gruber | |
| 2011/0254864 A1 | 10/2011 | Tsuchikawa et al. | |
| 2012/0050181 A1 | 3/2012 | King et al. | |
| 2012/0057064 A1 | 3/2012 | Gardiner et al. | |
| 2012/0084691 A1 | 4/2012 | Yun | |
| 2012/0105324 A1 | 5/2012 | Lee et al. | |
| 2012/0313880 A1 | 12/2012 | Geaghan et al. | |
| 2012/0320247 A1 | 12/2012 | Kim et al. | |

FOREIGN PATENT DOCUMENTS

| | | | |
|---|---|---|---|
| WO | WO 2009008568 A1 * | 1/2009 | |
| WO | WO 2009021836 A1 * | 2/2009 | |

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

Non-Final Office Action for U.S. Appl. No. 12/846,497, mailed on Dec. 14, 2012, Ilya D. Rosenberg et al., "Capacitive Sensing with Interpolating Force-Sensitive Resistor Array", 26 pages.

Office action for U.S. Appl. No. 12/846,328, mailed on Dec. 24, 2012, Rosenberg et al., "Two-Sided Touch Sensor", 15 pages.

Non-Final Office Action for U.S. Appl. No. 12/846,368, mailed on Feb. 15, 2013, Ilya D. Rosenberg et al., "Touch Distinction", 23 pages.

Office Action for U.S. Appl. No. 12/846,539, mailed on Feb. 15, 2013, Ilya D. Rosenberg et al., "Magnetic Touch Discrimination", 20 pages.

Non-Final Office Action for U.S. Appl. No. 13/247,669, mailed on Feb. 1, 2013, Julien G. Beguin et al., "Interacting Through Noncontact Gestures", 22 pages.

(56) References Cited

OTHER PUBLICATIONS

Office action for U.S. Appl. No. 12/846,519, mailed on Apr. 24, 2013, Rosenberg et al., "Touch Sensing Techniques", 23 pages.

Office action for U.S. Appl. No. 12/846,497, mailed on Apr. 25, 2013, Rosenberg et al., "Capacitive Sensing with Interpolating Force-Sensitive Resistor Array", 27 pages.

Office action for U.S. Appl. No. 12/846,295, mailed on May 21, 2013, Rosenberg et al., "Visually Consistent Arrays", 14 pages.

Office action for U.S. Appl. No. 13/247,699, mailed on Jul. 19, 2013, Beguin et al., "Interacting Through Noncontact Gestures", 32 pages.

Final Office Action for U.S. Appl. No. 12/846,539, mailed on Oct. 25, 2013, Ilya D. Rosenberg, "Magnetic Touch Discrimination", 26 pages.

Final Office Action for U.S. Appl. No. 12/846,295, mailed on Dec. 23, 2013, Ilya D. Rosenberg, "Visually Consistent Arrays including Conductive Mesh", 16 pages.

Office Action for U.S. Appl. No. 12/846,428, mailed on Oct. 9, 2013, Ilya D. Rosenberg, "Hardware Enabled Interpolating Sensor and Display", 25 pages.

Office action for U.S. Appl. No. 12/846,519, mailed on Nov. 14, 2013, Rosenberg, et al., "Touch Sensing Techniques", 24 pages.

Office Action for U.S. Appl. No. 12/846,328, mailed on Dec. 19, 2013, Ilya D. Rosenberg, "Two-Sided Touch Sensor", 13 pages.

Office action for U.S. Appl. No. 12/846,328, mailed on Aug. 15, 2013, Rosenberg et al., "Two-Sided Touch Sensor", 18 pages.

Office action for U.S. Appl. No. 12/846,368, mailed on Sep. 13, 2013, Rosenberg et al., "Touch Distinction", 36 pages.

Wolf, et al., "Angles, Azimuths, and Bearings", Pearson Prentice Hall, Elementary Surveying, 12th Edition, 2008, Chapter 7, pp. 165-184.

Office action for U.S. Appl. No. 12/846,428, mailed on Feb. 21, 2014, Rosenberg, et al., "Hardware Enabled Interpolating Sensor and Display", 30 pages.

Office Action for U.S. Appl. No. 13/247,699, mailed on Jan. 31, 2014, Julien G. Beguin, "Interacting Through Noncontact Gestures", 28 pages.

Office Action for U.S. Appl. No. 12/846,428, mailed on Aug. 21, 2014, Ilya D. Rosenberg, "Hardware Enabled Interpolating Sensor and Display", 24 pages.

Office action for U.S. Appl. No. 12/846,295, mailed on Sep. 24, 2014, Rosenberg et al., "Visually Consistent Arrays including Conductive Mesh", 17 pages.

Final Office Action for U.S. Appl. No. 13/247,699, mailed on Sep. 26, 2014, Julien G. Beguin, "Interacting Through Noncontact Gestures", 30 pages.

Office action for U.S. Appl. No. 12/846,368, mailed on Jul. 17, 2014, Rosenberg et al., "Touch Distinction", 45 pages.

Office Action for U.S. Appl. No. 12/846,539, mailed on Feb. 24, 2015, Ilya D. Rosenberg, "Magnetic Touch Discrimination", 17 pages.

Office Action for U.S. Appl. No. 12/846,497, mailed on Oct. 23, 2014, Ilya D. Rosenberg, "Capacitive Sensing with Interpolating Force-Sensitive Resistor Array", 25 pages.

Final Office Action for U.S. Appl. No. 12/846,428, mailed on Dec. 1, 2014, Ilya D. Rosenberg, "Hardware Enabled Interpolating Sensor and Display", 26 pages.

Office Action for U.S. Appl. No. 12/846,519, mailed on Mar. 11, 2015, Ilya D. Rosenberg, "Touch Sensing Techniques", 35 pages.

Final Office Action for U.S. Appl. No. 12/846,497, mailed on Mar. 20, 2015, Ilya D. Rosenberg, "Capacitive Sensing with Interpolating Force-Sensitive Resistor Array", 37 pages.

\* cited by examiner

GESTURES AND TOUCHES ON FORCE-SENSITIVE INPUT DEVICES

RELATED APPLICATION

This application claims the benefit of U.S. Provisional Application No. 61/230,592 filed on Jul. 31, 2009 which is incorporated by reference herein in its entirety.

BACKGROUND

Research on human-computer interactions seeks to improve the ease with which people use electronic devices. Pursuing this objective has led to an array of different input devices such as keyboards, mice, trackballs, joysticks, game controllers, microphones, touch screens, graphics tablets, and the like. Each of these various input devices is supported by software that interprets the signals generated by the device hardware. For some technologies, such as voice recognition, it is advances in software rather than advances in hardware that contribute most to the usability of an input device. Continuing advances in input device hardware require concordant advances in software to maximize the usability of new types of input devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Restive touch sensors employ multiple layers of conductive material to detect pressure-based inputs. This is compatible with stylus-based input but does not accurately detect fingertip touch inputs. Capacitive touch detects electrical changes caused by a fingertip. This type of touch surface is much more accurate and responsive than resistive technologies, but does not work with a conventional stylus. A new type of touch sensor incorporates both restive and capacitive touch sensing. Interpolating force-sensitive resistance (IFSR) uses force-sensitive resistors, which become more conductive as a user applies different levels of pressure to the touch sensor. Conventional sensors (both resistive and capacitive) detect touch pressure only as a binary condition—touch or no touch. This capability of IFSR arrays to detect varying strengths of touches provides for richer input capabilities.

Electronic devices such as cellular phones, portable media players, tablet computers, netbooks, laptops, electronic book ("eBook") readers, and so forth, incorporate various types of touch sensors that enable users to control and otherwise interact with the devices. These touch sensors may be input-only devices such as a drawing tablet or combined with an output device in a touch-screen display. Touch-screen displays are intuitive and suitable for mobile devices because a separate tablet input device would be impractical. However, the ergonomics of desktop computing systems with larger displays generally located at eye level away from a user's hands, favor input tablets that can be placed on a desktop next to a mouse or keyboard.

This disclosure describes, in part, architecture and techniques for utilizing a force-sensitive touch sensor to interact with a computing device. The ability to detect an amount of force as well as a location on the touch sensor introduces a third dimension to user interaction with touch sensors. Use of a force-sensitive touch sensor (touch-screen or tablet) creates a touch profile of all the factors associated with the touch input (e.g., location, force, and time). Various commands may be assigned to different touch profiles creating new types of user inputs and human-computer interactions not possible with other input devices.

Illustrative Touch-Screen Device

Figure 1:
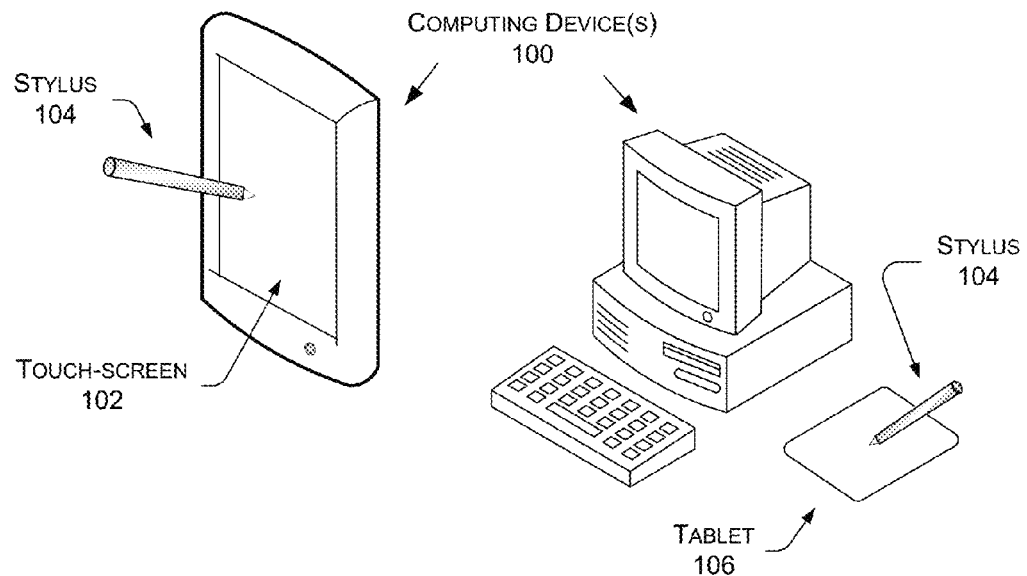
FIG. 1 depicts multiple computing devices configured to accept input from force-sensitive touch sensors and a schematic of inputs generated by a force-sensitive touch sensor.
Figure 1:
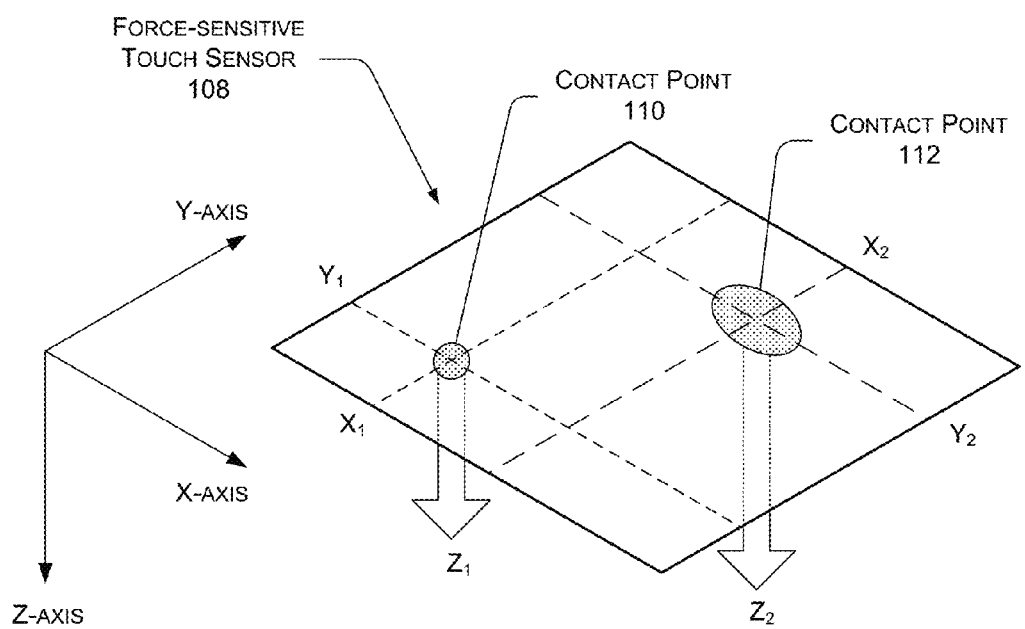

FIG. 1 depicts computing device(s) 100 configured to receive touch input. The computing device(s) 100 may be any type of computing device such as a personal digital assistant, mobile telephone, electronic book reader, media player, net book, laptop computer, desktop computer, server, etc. In some implementations, the computing device(s) 100 may be equipped with a touch-screen 102 for receiving input that also functions as a display for generating output. The touch-screen 102 may be operated by application of incident force, such as a user finger or stylus 104 pressing upon the touch-screen 102. In other implementations, the touch sensor may comprise a tablet 106 that accepts touch input but does not function as a display. The tablet 106 may also be operated by a finger, a stylus 104, or other object.

The touch screen 102 and tablet 106 both leverage a force-sensitive sensor 108. In one particular implementation, the force-sensitive sensor 108 is embodied as an interpolating force-sensitive resistance (IFSR) sensor which employs force-sensitive resistors. Each application of incident force on the force-sensitive touch sensor 108 creates a contact point, such as the two contact points 110 and 112 illustrated in FIG. 1. The shape of contact at the contact point 110 and 112 is determined by the object creating the incident force on the force-sensitive touch sensor 108. A stylus 104 may create a smaller, circular shaped contact point 110 while a fingertip may create a larger and generally oval-shaped contact point 112. The contact points 110 and 112 may be characterized by the location of the contact on the touch-sensitive touch sensor 108 represented by X and Y coordinates. In some implementations, a center of each contact point 110 and 112 is defined as the location of the contact. However, the contact point 110 and 112 may also be characterized by the area of the force-sensitive touch sensor 108 that receives incident force. The amount and shape of a surface that is being touched may distinguish between a finger and a stylus, a sharp stylus and a blunt stylus, between a thumb and a pinky, etc.

The force-sensitive touch sensor 108, by virtue of being force-sensitive, also detects a magnitude of incident force applied to the surface of the touch sensor 108. This sensitivity allows the force-sensitive touch sensor 108 to detect a "depth" of touch which adds a Z coordinate to the touch input. Accordingly, each application of incident force to the touch-sensitive touch sensor 108 may be interpreted as having a location (e.g., X and Y), a surface area/shape (e.g., area in X-Y plane), and an amount of force (e.g., Z).

For convenience only, the force-sensitive touch sensor 108 is shown in a generally rectangular configuration. However, it is understood that the force-sensitive touch sensor 108 may be implemented in any shape, and may have any ratio of height to width. Also, for stylistic or design purposes, the force-sensitive touch sensor 108 may be curved or otherwise non-linearly shaped. Furthermore the force-sensitive touch sensor 108 may be flexible and configured to fold or roll.

Figure 2:
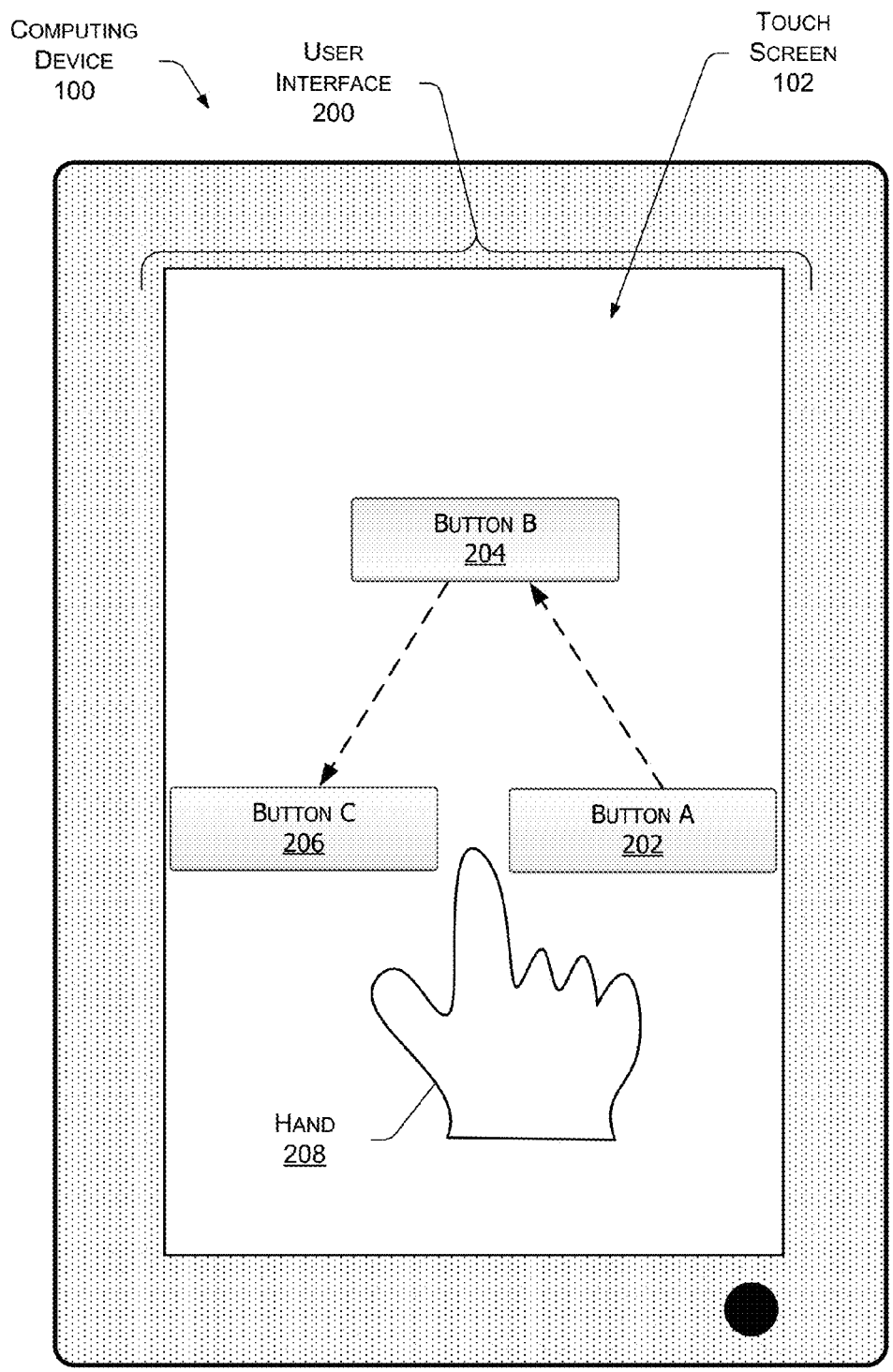
FIG. 2 depicts one of the computing devices from FIG. 1 having a touch screen with multiple soft buttons displayed on the touch screen.

FIG. 2 is an illustrative user interface 200 of the computing device(s) 100 of FIG. 1. The computing device(s) 100 includes a touch screen 102 displaying the user interface 200. The user interface 200 includes a plurality of soft buttons 202, 204, and 206. Although shown here for the sake of simplicity as generally rectangular buttons, the soft buttons 202, 204, and 206 may take any shape or configuration such as a spin button, scroll bar, slider bar, hyperlink, and the like. The soft buttons 202, 204, and 206 broadly represent any area of the touch screen 102 that, when receiving a touch, is interpreted by the computing device 100 as a command. In this example, a hand 208 of a user first touches the Button A 202, then Button B 204, and next Button C 206 forming a roughly triangular pattern of movement. However, the user may alternatively use a stylus or other implement (e.g., including other body parts such as a toe or a nose) for pressing on the touch screen 102. At each of the buttons 202, 204, and 206, the hand 208 of the user presses down on the touch screen 102 with a greater amount of incident force. The user interface 200 may change in response to detecting the increased incident force by changing the visual appearance of the soft button corresponding to the region of the touch screen 102 which is pressed by the user. The change in visual appearance may be a highlighting, appearance of a physical button being depressed, a changing shading of the soft button, or other visual change.

Figure 3:
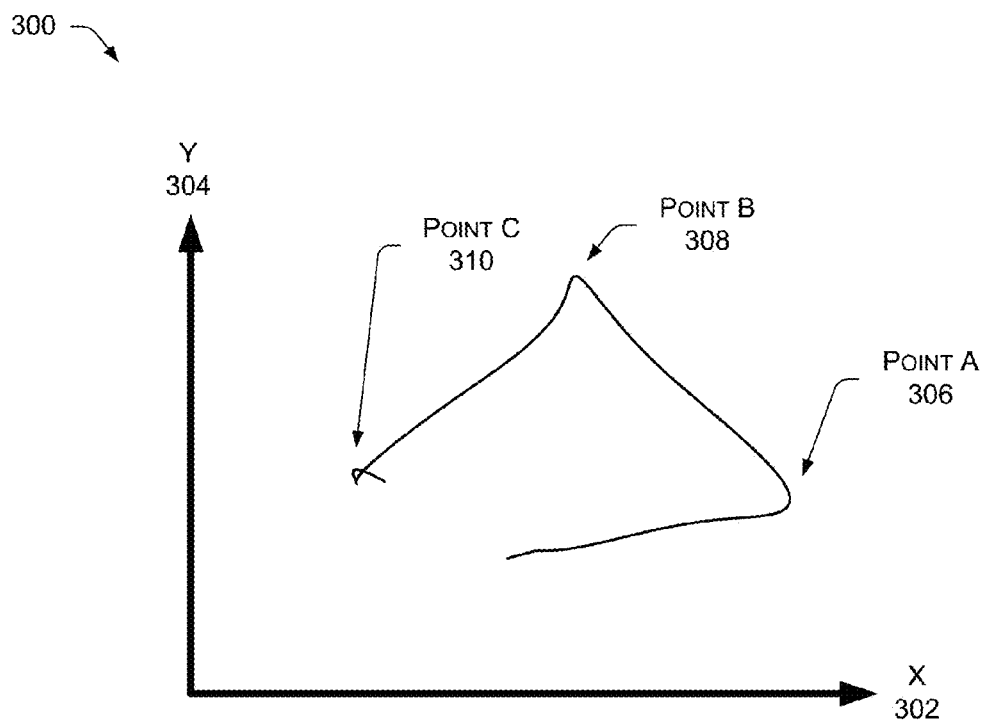
FIG. 3 is two illustrative graphs showing force and associated touch thresholds for input on the force-sensitive touch sensor and showing locations of touch applied to the computing device of FIG. 2.
Figure 3:
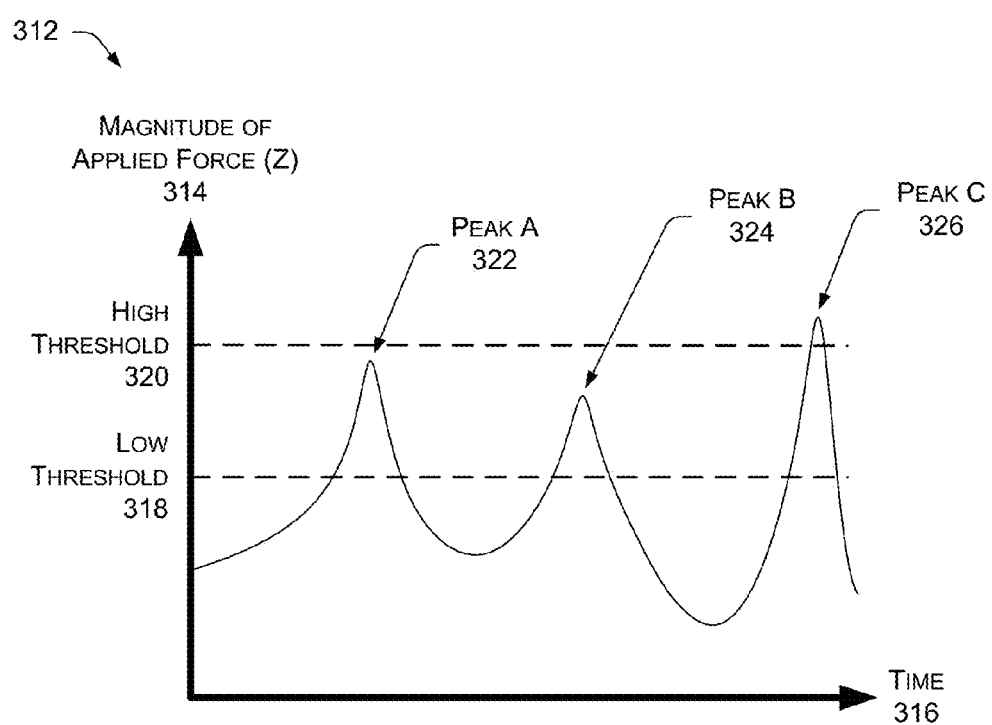

FIG. 3 includes an illustrative graph 300 showing the movement of the hand 208 along the surface of the touch screen 102 shown in FIG. 2. The x-axis 302 of the graph 300 represents a horizontal dimension of the touch screen 102. The y-axis 302 of the graph 300 represents a vertical dimension of the touch screen 102. The hand 208 moving across the touch screen 102 over Button A 202, Button B 204, and Button C 206 forms a roughly triangular shape. When this roughly triangular shape is compared with the user interface 200 shown in FIG. 2, Point A 306 corresponds with Button A 202, Point B 308 corresponds with Button B 204, and Point C 310 corresponds with Button C 206. This graph 300 captures a representation of the movement of the user's hand 208 in two dimensions across the touch screen 102 first contacting the touch screen 102 at the lower middle of the screen and ceasing contact with the touch screen 102 at Point C 310.

FIG. 3 further includes an illustrative graph 312 which shows force applied by the hand 208 shown in FIG. 2 as it moves across the touch screen 102. The vertical axis 314 (or Z-axis) represents a magnitude of force applied by the user on the touch screen 102, while the horizontal axis 316 of the graph 312 represents a time. Thus, the graph 312 shows changes in how hard the user presses on the touch screen 102 over time. The magnitude of applied force 314 may be interpreted by a touch sensor as a Z-axis component as shown in FIG. 1. Where the touch sensor is capable of providing a magnitude of force, that is, how hard an object is pressing on the touch sensor, the magnitude may be used to set one or more touch thresholds. For illustrative purposes, and not by way of limitation, assume that four touch levels are used. These four touch levels consist of no touch, light touch, medium touch, and hard touch. A low threshold 318 shown as a dashed line separates light touches from medium touches. A high threshold 320 shown as a dashed line separates medium touches from hard touches. Not shown is the trivial case of the no touch threshold in which no force is applied.

The touch thresholds may be absolute or relative. An absolute threshold is set such that a specific quantity of force is required to meet that threshold. For example, where an absolute threshold is in use, a light touch may comprise a force application of 1 Newton (N) while a medium touch is 2 N, and a hard touch is 3 N.

Relative touch thresholds, in contrast, may be determined by comparison of force applied between two or more digits, between two or more touches of the same finger, or other factors. For example, a hard touch may be considered to be three times the force applied by the lightest touch made by a user. In other implementations, force comparisons may be made between fingers on different hands, different drawing implements (e.g., a hard stylus compared to a soft brush), or different users. Thresholds may also be dynamic and adjust over time. The computing device 100 may automatically raise and lower the threshold to adapt to the user over time (e.g., during prolonged use of the computing device 100 the user's touches may gradually become softer) and continue to differentiate different strength touches. A prolonged touch may be interpreted as the user resting his or her hand (or another object) on the touch sensor and the amount of force applied by the prolonged touch may cause a baseline threshold to adjust upwards to account for the force of the prolonged touch.

In this illustration, the graph 312 depicts an unbroken touch (i.e., the user never removes his or her finger from the touch sensor). This touch exceeds the low threshold 318 three times at Peak A 322, Peak B 324, and Peak C 326. At Peak C 326, the magnitude of applied force also exceeds the high threshold 320. Between each of the peaks 322, 324, and 326 the magnitude of force applied decrease to the level of a light touch.

In this example, the increase in applied force at Peak A 322 corresponds to the X-Y coordinates of Point A 306. This represents the hand 208 pressing harder on the touch screen 102 when the hand 208 is touching Button A 202. Analogous to pressing an actual button to activate, this force-sensitive gesture allows for the pressing of a soft button to provide user input to the computing device 100. The computing device 100 may interpret contact with Button A 202 that exceeds the magnitude of force of the low threshold 318 as a "press" while not responding to lower levels of force. This configuration allows the user to move a finger or stylus across the touch screen 102 with a low amount of applied force without activating every soft button that the finger or stylus passes over. Peak B 324 represents a similar increase in force or "press" at Point B 308 which corresponds to pressing Button B 204.

Different magnitudes of touch may result in different input functions. For example, Button C 206 may only respond to a hard touch. The hard touch is represented by the magnitude of force at Peak C 326 exceeding the high threshold 320. As with the other soft buttons, Peak C 326 corresponds to Point C 310 which in turn corresponds with Button C 206. A harder touch may be required to activate Button C 206 than the other soft buttons because a function assigned to Button C 206 may have negative consequences if inadvertently activated (e.g., turning off power to the computing device 100). A single soft button, for example Button C 206, may also provide different commands depending on a level of applied force. A medium touch may put the computing device 100 into a sleep mode and a hard touch may shut down the computing device 100.

The force-sensitive touch sensor 108 detects touches and a touch profile including X, Y, and Z components may be interpreted by the computing device 100 according to any number of different threshold force levels, soft button locations, and the like. Chording by pressing multiple soft buttons simultaneously is also possible. For example, pressing Button A 202 and Button C 206 with a medium touch while pressing Button B 204 with a hard touch may correspond to a different command than another combination of buttons and pressures. In some implementations, this may be used to simulate musical instruments such as a fret of a guitar.

Figure 4:
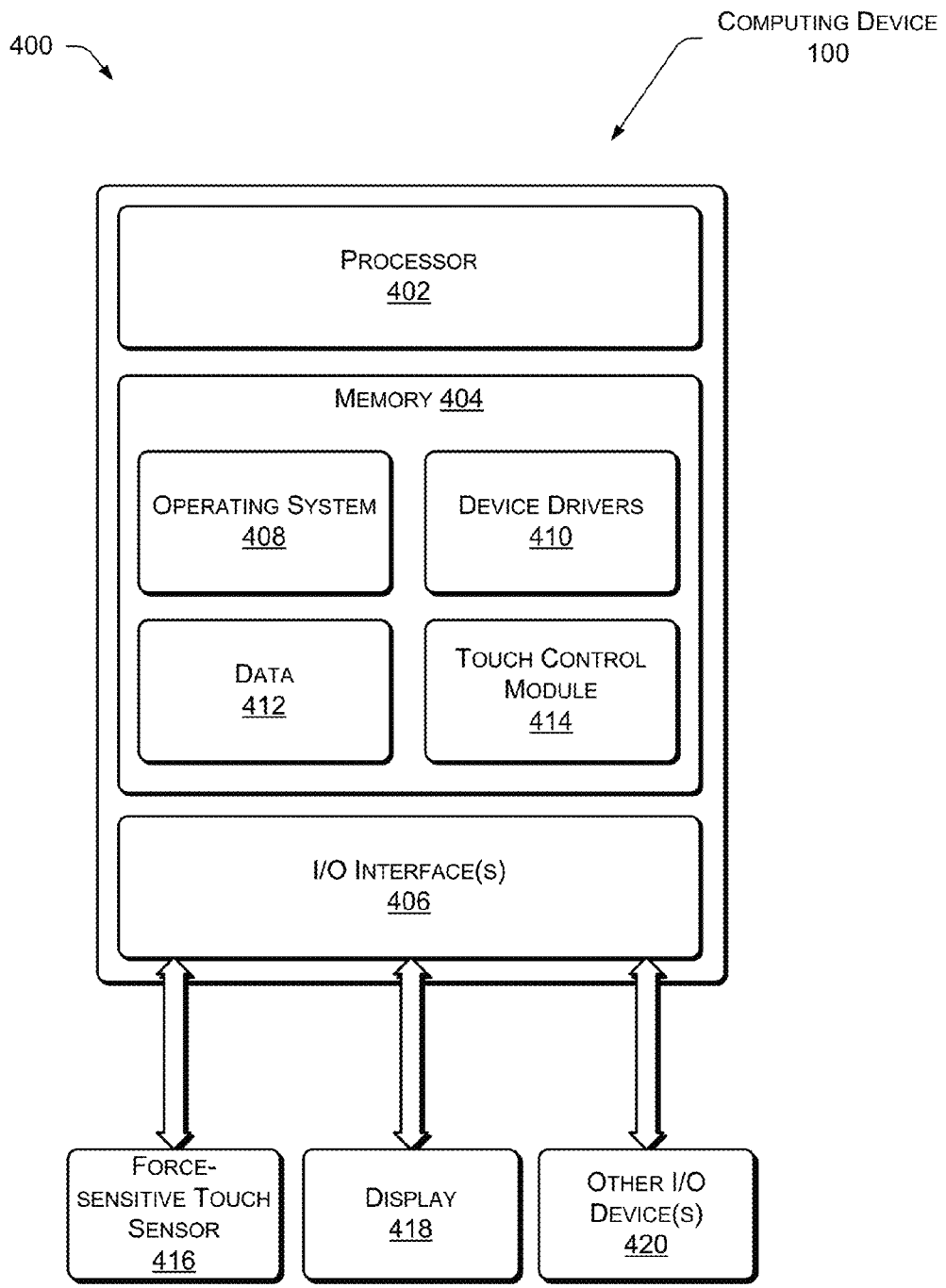
FIG. 4 is an illustrative block diagram of the computing device from FIGS. 1 and 2 with a touch control module configured to interpret inputs from the force-sensitive touch sensor.

FIG. 4 shows selective functional components 400 of the computing device 100 from FIG. 1. In a basic configuration, the computing device 100 includes a processor 402 and a memory 404. Each processor 402 may itself comprise one or more processors. The memory 404 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media. The computing device 100 may also include one or more input/output (I/O) interfaces 406. The I/O interface 406 manages communications between the computing device 100, the processor 402, input devices, and output devices. In some implementations the input and output devices may be contained in the same housing or otherwise integrated with the computing device 100.

The memory 404 may store an operating system 408 configured to manage operation of the computing device 100. The operating system 408 may be operatively coupled to one or more device drivers 410. The device drivers 410 may control interactions with various I/O devices coupled to the computing device 100 via the I/O interface 406. The memory 404 may also store data 412, which may comprise executable programs, databases, user settings, configuration files, user files, and so forth. Executable instructions comprising a touch control module 414 may also be stored in the memory 404. The touch control module 414 may be configured to receive data from a force-sensitive touch sensor 416 coupled to the computing device 100 through the I/O interface 406. The force-sensitive touch sensor 416 may be similar to the force-sensitive touch sensor 108 shown in FIG. 1. In some implementations, the operating system 408, one or more of the device drivers 410, and so forth, may perform some or all of the functions of the touch control module 414.

The force-sensitive touch sensor 416 may comprise cross point arrays, such as capacitive, magnetic, force sensitive resistors, interpolating force sensitive resistors, and so forth. The force-sensitive touch sensor 416 may be configured such that it is combined with a display 418 to function as a touch-sensitive display like the touch screen 102 shown in FIGS. 1 and 2. The touch control module 414 is configured to determine characteristics of interaction with the force-sensitive touch sensor 416. These characteristics may include the location of a touch on the force-sensitive touch sensor 416, a magnitude of the force, shape of the touch, and so forth.

The output devices coupled to the I/O interface(s) 406 may include one or more display components 418 (or "displays"). In some implementations, multiple displays may be present and coupled to the I/O interface(s) 406. These multiple displays may be located in the same or different enclosures or panels.

The display 418 may present content in a human-readable format to a user. The display 418 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The I/O interface 406 may also connect to one or more other I/O devices such as keyboard, mouse, microphone, speaker, haptic vibrator, camera, global positioning system, PC Card component, and so forth.

Illustrative Usage Scenarios

The functionalities of a force-sensitive touch sensor allow for many possible usage scenarios. Unlike a touch sensor lacking force-sensitivity, the ability to detect how hard a user is pressing provides another dimension to the input received from the hardware. Generally, a location of a touch on the force-sensitive touch sensor may select an item and the level of force may indicate a type of interaction with that item. Several illustrative usage scenarios are shown below.

Figure 5:
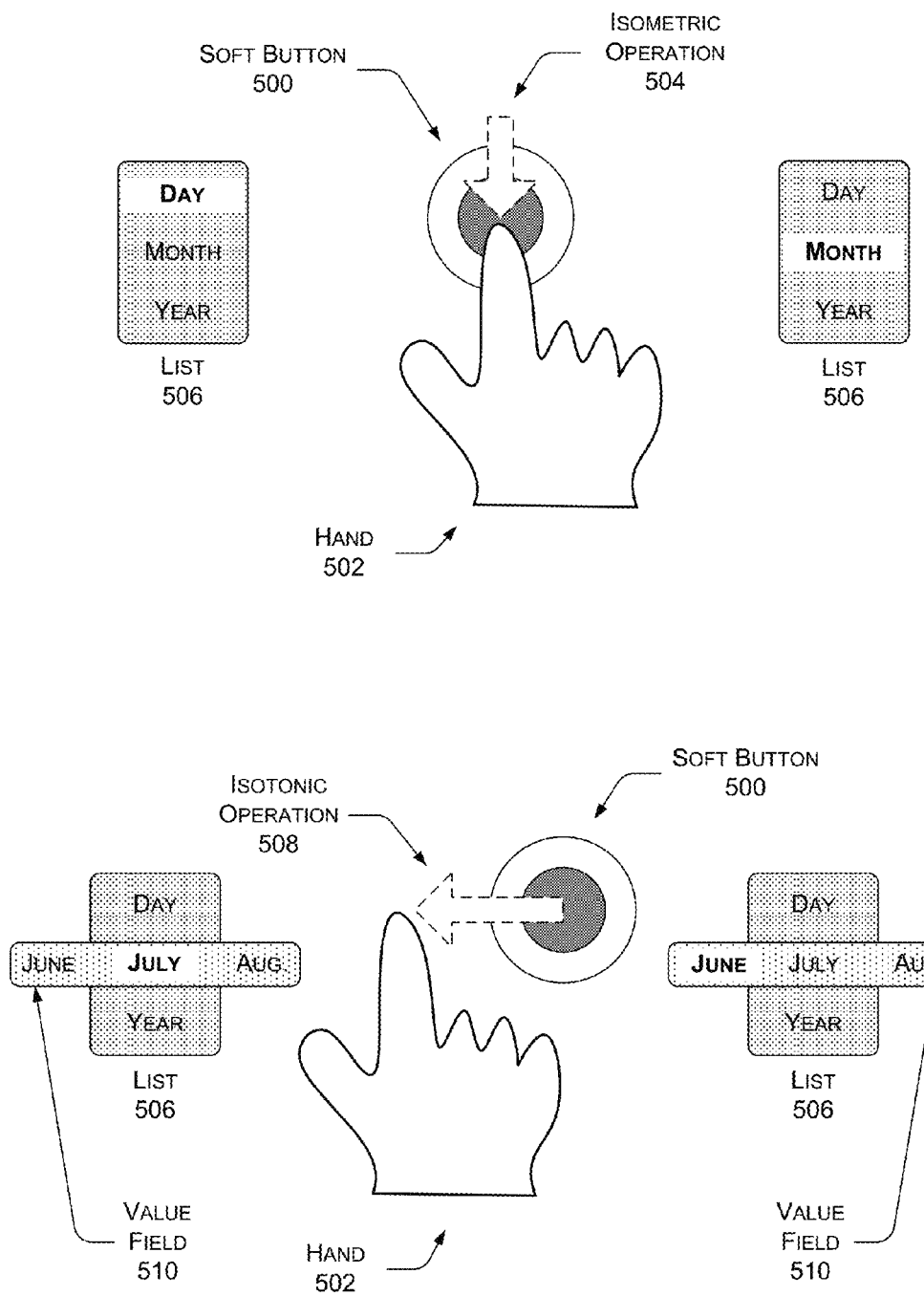
FIG. 5 illustrates a user interacting with a soft button through both isometric and isotonic operations.

FIG. 5 depicts user interactions with a soft button 500 through a combination of isometric and isotonic operations. An isometric operation involves varying pressure (i.e., Z-axis input) of a touch without varying position (i.e., X- and Y-axis). Conversely, an isotonic operation involves varying the position of a touch without varying pressure. The soft button 500 may be an image presented on a use interface such as the user interface 200 of FIG. 2. The soft button 500 is a metaphor for a physical button. The location and shape of the soft button 500 may be determined by software such as the touch control module 414. The soft button 500 and corresponding hand 502 are illustrated twice with a top representation intended to demonstrate the isometric operation and the bottom representation intended to demonstrate the isotonic operation. Touches detected by a force-sensitive touch sensor may be interpreted by the touch control module 414 shown in FIG. 4 as isometric operations or isotonic operations.

Even when a user intends to perform only isometric (or isotonic) operations, he or she may not be able to avoid small isotonic (or isometric) movements. In some implementations, there may be a threshold similar to the thresholds 318 and 320 shown in FIG. 3 below which isotonic (or isometric) operations are ignored. The touch control module 414 may also switch between isometric and isotonic modes during which only isometric or isotonic operations respectively are interpreted as user input. Thus, detection of isotonic operations may temporarily suspend interpretation of isometric operations and vice-versa.

In this example, the user may press on a touch sensor with his or her hand 502 to activate the soft button 500. Although a hand is shown, a stylus or other implement may also be used. Pressing down on the soft button 500 is an isometric operation 504. In response to the force applied to the touch screen, the touch control module 414 may advance one item through a list 506 of items. The list 506 may advance one item in response to a magnitude of force exceeding a threshold and then returning to a level below the threshold. Thus, every press advances the list one item. The list 506 may show that "Day" is selected and then in response to the isometric operation 504, transition to show selection of the next item or "Month". In other implementations, the item selected in the list 506 changes based on a magnitude of force applied to the touch sensor. Thus, a soft touch may select "Day," a medium touch may select "Month," and a hard touch may select "Year." In some implementations, the amount of force necessary to "press" the soft button 500 may be different from the amount of force to "release" the soft button 500. For example, pushing beyond a threshold may activate the soft button 500, but allowing the amount of pressure to fall below the threshold may not deactivate the soft button 500. The threshold to deactivate the soft button 500 may be lower than the threshold to activate the soft button 500.

Following the first, isometric, mode of input selecting an item, a second, isotonic, mode of input may assign a value to the item. The switch from isometric mode to isotonic mode may be automatic based on analysis of touch input by the touch control module 414. In other implementations, it may be manual, for example, by the user pressing another soft button or otherwise explicitly instructing the computing device 100 to switch from isometric mode to isotonic mode.

Moving the hand 502, or another item, across the touch sensor from the soft button 500 to the left is one example of an isotonic operation 508. This second mode of input, the isotonic operation 508, may assign a value to the item selected by the previous isometric operation 504. In this example, the list 506 displaying the selected item "Month" may change to displaying a value field 510 in which the user can indicate which month (i.e., the value) he or she wishes to assign to the item "Month." Here, sliding the hand 502 to the left changes the value for "Month" from "July" to "June." A distance of the lateral movement may determine how many months are changed (e.g., a short slide changes one month and a long slide changes six months) or a number of times the lateral movement is made may correspond to the change in month (e.g., one slide to the left changes July to June, two slides changes July to May, etc.). Other isotonic operations 508 besides sliding motions are also possible.

Following the isotonic operation 508, the touch control module 414 may interpret a push on the soft button 500 as a signal to switch back to the isometric mode of operation. The interaction may be repeated to assign a value to "Day" and to "Year."

Figure 6:
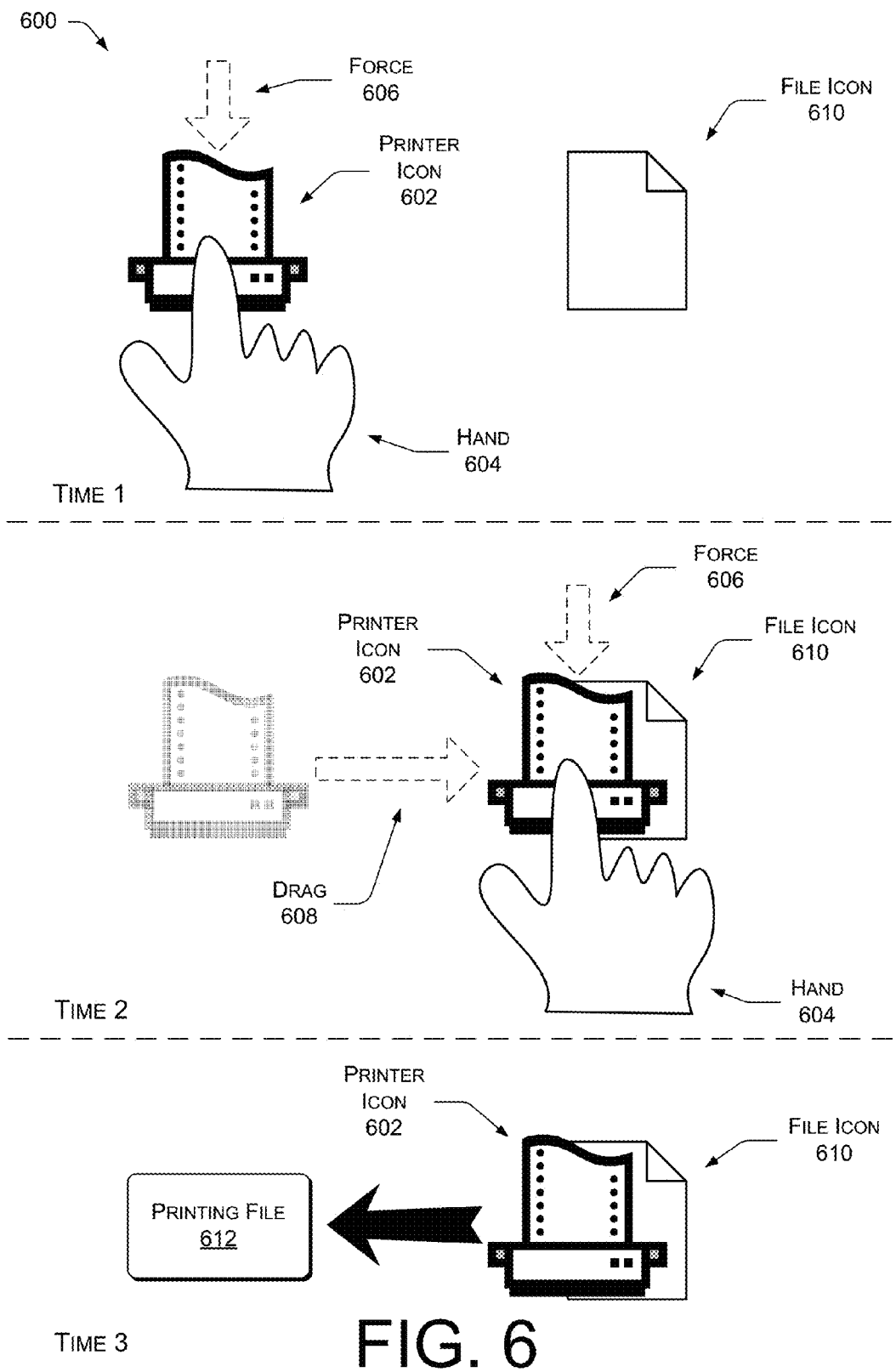
FIG. 6 illustrates a user intuitively combining graphical icons using a force-sensitive touch sensor to generate a command.

FIG. 6 depicts a sequence of user interface (UI) operations performed on a user interface 600 depicting multiple graphical icons. At time 1, an illustrative item on the user interface 600 may be a printer icon 602 that represents a printer connected to the computing device 100 through the I/O interface(s) 406. The touch control module 414 may recognize a touch from the user's hand 604 (or other item) against one or more contact points on the force-sensitive touch sensor 416. If the touch control module 414 determines that the location on the force-sensitive touch sensor 416 corresponds with the location of the printer icon 602, then the touch control module 414 may determine a magnitude of force 606 applied at the printer icon 602. If the magnitude of force 606 exceeds a threshold (e.g., a medium touch) then the touch control module 414 may interpret that touch as a selection of the printer icon 602.

At time 2 following selection, movement of the hand 604 causes a visual movement or drag 608 of the printer icon 602 across the user interface 600. The printer icon 602 may be dragged 608 so long as the force 606 is maintained above the threshold level and the printer icon 602 may be released once the applied force 606 falls below the threshold level (e.g., the user removes his or her finger from the force-sensitive touch sensor 416). This combination of push-and-slide is an isometric operation followed by an isotonic operation similar to that shown above in FIG. 5.

In some implementations, items (e.g., the printer icon 602) may be selected and dragged across the user interface 600 to a particular destination. One type of destination may be another icon such as a file icon 610. Dragging the printer icon 602 onto the file icon 610 may join the icons and modify the functionality of both icons. Alternatively, the file icon 610 may be dragged to the printer icon 602. In some implementations, an additional application of force 606 (e.g., a hard touch) may be required to join the first icon with the second.

At time 3, the operating system 408 or other component of the computing device 100 may interpret the printer icon 602 joined with the file icon 610 as a command to print the file. The user interface 600 may display an indication 612 that the file is printing. The modified functionality of an item (e.g., the printer icon 602) may be provided as a command to the processor 402 of the computing device 100 when the force ceases to be applied by the user. Thus, removing the hand 604 from the combination of the printer icon 602 and the file icon 610 may start the printing. If pressure is kept on the icons, further combinations may be possible.

Although only two icon are discussed in this example, any number of icons may be chained together to create further modifications. For example, the joined printer icon 602 and the file icon 610 may be combined with an icon for color to indicate color printing. Other types of items may, of course, be combined by this alternation of isometric operations and isotonic operations.

Figure 7:
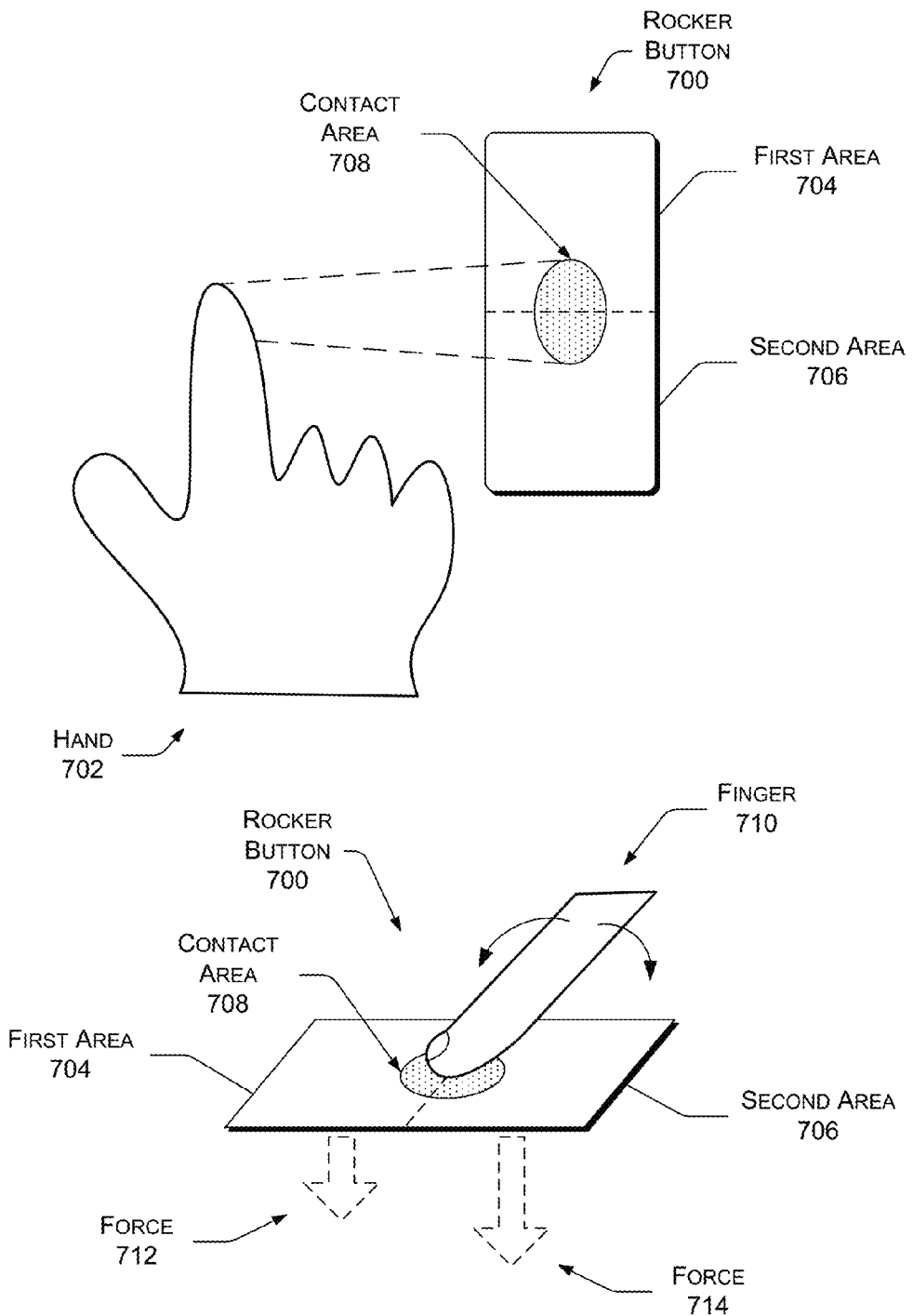
FIG. 7 illustrates a user operating a virtual rocker button on a force-sensitive touch sensor.

FIG. 7 depicts user interaction with a rocker button 700 which may be presented on the user interface 200 of FIG. 2. The rocker button 700 may be configured as a graphic user interface element in which two areas of a touch sensor that are adjacent or near one another (e.g. within about 1-5 mm) function analogously to two sides of a physical rocker button. The location of the rocker button 700 may be a predefined region of the touch sensor or the rocker button 700 may be created at any location that the user contacts the touch sensor. The rocker button 700 may be split equally into two halves forming a first area 704 and a second area 706. The touch control module 414 may be configured to detect a touch applied to the first area 704, a touch applied to the second area 706, and to compare the magnitude of force applied to each area 704 and 706. Because the first area 704 and the second area 706 are adjacent or near to one another, the user's hand 702 or other object may create a contact area 708 that overlaps in part with the first area 704 and also overlaps in part with the second area 706. Thus, the user may actuate both areas 704 and 706 simultaneously. In some implementations, the touch control module 414 may be configured to respond only to isometric inputs, application of incident force, on the rocker button 700 and not respond to isotonic inputs.

Depending on the size and shape of the rocker button 700, a single finger 710 of the user's hand 702 may create a contact area 708 on the rocker button 700 that spans the first area 704 and the second area 706. That touch creates an incident force 712 against the first area 704 and an incident force 714 against the second area 706. When the magnitude of force 712 applied to the first area 704 is greater than the magnitude of force 714 applied to the second area 706, the touch control module 414 may initiate a first command. Conversely, as shown in FIG. 7, when the magnitude of force 714 applied to the second area 706 is greater than the magnitude of force 712 applied to the first area 704, the touch control module 414 may interpret this touch as a signal to initiate a second command. The first command and the second command may be, but are not necessarily, opposite commands that increase and decrease, respectively, a value (e.g., raise a number by one or lower the number by one, increased the pitch of a musical note or decrease the pitch of the musical note, etc.). The amount of force 712 and 714 may also change a rate at which the value changes. For example, a greater amount of force 712 on the first area 704 may increase the value faster than a lesser amount of force 712 on the first area 704.

In some implementations, the touch sensor technology (e.g., IFSR) may detect true anti-alias images of the incident force applied to the rocker button 700. The anti-aliased images allow for very precise and smooth detection of changes in the relative force 712 and 714 applied to the first area 704 and the second area 706. Thus, when the incident force is applied by a finger 710, the relative magnitude of force 712 applied to the first area 704 and that relative magnitude of force 714 applied to the second area 706 may vary due to a change in the angle at which the finger 710 contacts the surface of the rocker button 700. Thus, the user can change a command generated by the rocker button 700 by changing only his or her finger angle without deliberately changing finger pressure.

As the angle at which the finger 710 contacts the touch sensor changes, the contact area 708 may move slightly. A similar change in X and Y position of the contact area 708 may occur when the finger 710 is slid across the surface of the touch sensor. An amount of force 712 and 714 applied by the finger 710 may be used to differentiate between a changing angle of contact and a slide. For example, if an approximate coefficient of friction between the finger 710 (or other object such as a stylus) and the touch sensor is known, then the touch control module 414 may recognize that a light touch will side across the surface of the touch sensor easier than a firm touch and differentiate between a leaning finger and a sliding finger based on the amount of applied force 712 and 714 in conjunction with the coefficient of friction.

Figure 8:
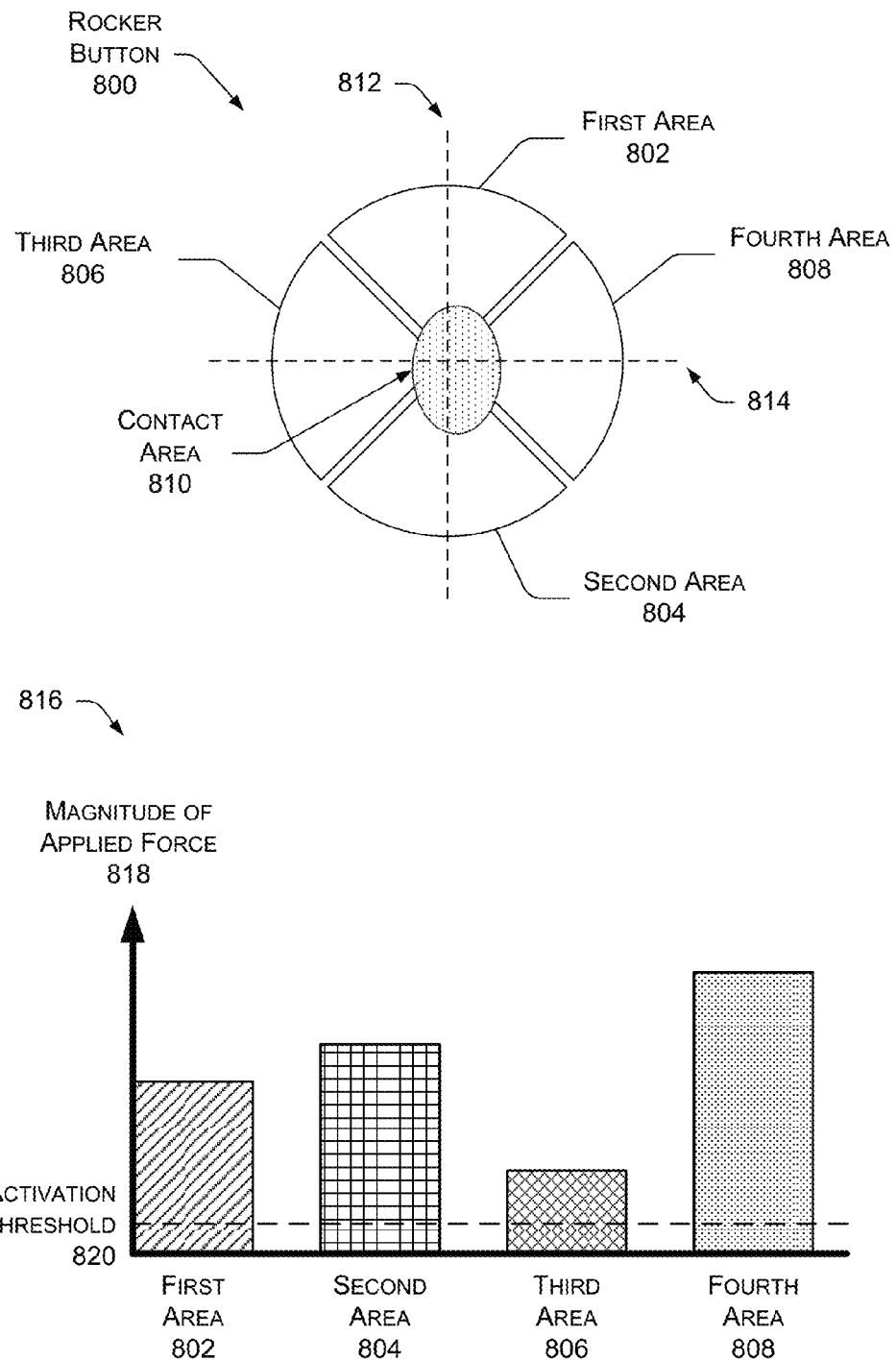
FIG. 8 depicts an illustrative four-way virtual rocker button and a graph showing variations in force across the four-way virtual rocker button.

FIG. 8 depicts a rocker button 800 having four discrete contact areas. The first area 802 and the second area 804 of the rocker button 800 may be similar to the first area 704 and the second area 706 shown in FIG. 7. In addition, the rocker button 800 includes a third area 806 and a fourth area 808. At the center of these four areas 802, 804, 806, and 808 is a contact area 810 formed by an object, such as a finger, touching the center of the rocker button 800. In this example configuration, the rocker button 800 is arranged such that a line 812 bisecting the first and second areas 802 and 804 is perpendicular to a line 814 bisecting the third and fourth areas 806 and 808. In some arrangements, the two bisecting lines 812 and 814 may align with the X- and Y-axis of the force-sensitive touch sensor 108 as shown in FIG. 1.

In this example, the contact area 810 is slightly off center shifted towards the fourth area 808. The corresponding magnitudes of applied force detected by the four areas 802, 804, 806, and 808 of the rocker button 800 are shown in graph 816. The height of each bar represents the magnitude of applied force 818. In some implementations, there may be an activation threshold 820 below which pressure on the rocker button 800 is ignored by the touch control module 414. Here, the magnitude of applied force detected at the fourth area 808 is greater than the magnitude of force applied to any of the other three areas 802, 804, and 806, and thus, this may be interpreted as a signal to initiate a command associated with the fourth area. In other implementations, an amount of force applied to each area of the rocker button 800 may be compared with an amount of force applied to the opposite area. For example, force applied to the second area 804 is compared with force applied to the first area 802 and in this example the force applied to the second area 804 is greater. Pressure on the rocker button 800 may be interpreted as multiple commands, for example, a command associated with the fourth area 808 and a command associated with the second area 804. For example, the rocker button 800 may be used to control horizontal and vertical scroll bars of a display window. Approximately equal pressure on the four areas 802, 804, 806, and 808 of the rocker button 800 may also be interpreted a press on a soft button such as the soft button 500 shown in FIG. 5. Alternatively, an amount of pressure that exceeds a threshold on one or more of the four areas 802, 804, 806, and 808 may be interpreted as activation of a soft button (i.e., pressing hard on the rocker button 800 turns it into a soft button). Thus, a single region of a touch screen, or other touch sensor, may function both as a press-to-activate soft button and as a rocker button.

When the magnitude of force on the second area 804 exceeds the magnitude of force on the first area 802 that may be interpreted by the touch control module 414 as a command to move the vertical scroll bar down. Similarly, when the magnitude of force on the fourth area 808 exceeds the magnitude of force on the third area 806, the action may be interpreted by the touch control module 414 as a command to move the horizontal scroll bar to the right. Although two illustrative configurations of rocker buttons 700 and 800 with two and four areas respectively are shown in FIGS. 7 and 8, it is to be understood that other configurations are also within the scope of this disclosure. For example, a rocker button may be omnidirectional and capable of detecting the angle of applied force in 360° (not just two or four directions). The differential pressure is in the horizontal and vertical directions may change horizontal and vertical components of any two-dimensional value vector.

Figure 9:
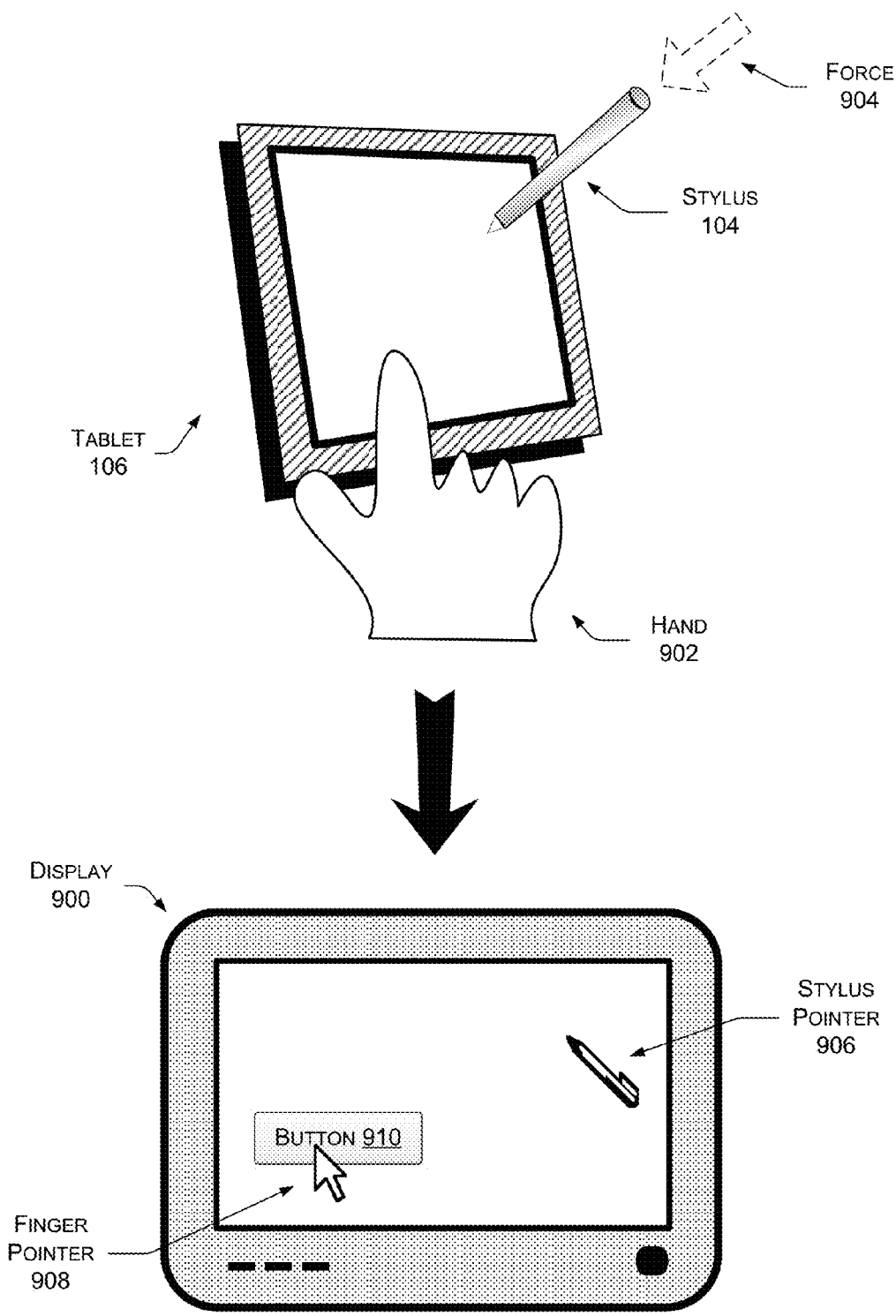
FIG. 9 depicts a force-sensitive touch sensor as an illustrative tablet input device and a display showing inputs from the tablet.

FIG. 9 depicts the tablet input device 106 of FIG. 1 functioning as an input device to generate a touch cursor on a display 900. As discussed above, a hand 902, a stylus 104, or other object in contact with the tablet 106 may be detected by force-sensitive touch sensors. The tablet 106 may also detect a magnitude of force 904 generated by the object touching the force-sensitive touch sensor. As shown in the illustration of the tablet 106, the hand 902 and the stylus 104 may be used simultaneously to interact with the tablet 106. A single user may interact with the tablet 106 by pointing with one hand 902 and by holding the stylus 104 in another hand. Multiple users may also interact with the tablet 106 simultaneously using any combination of hands and styluses.

In this illustration, a touch cursor or pointer is generated on the display 900 having a location on the display that is based on the position of the object creating force 904 against the force-sensitive touch sensor in the tablet 106. For example, pressing on the upper right of the tablet 106 results in a pointer being displayed in the upper right of the display 900. Touches made by a stylus 104 or a hand 902 may be differentiated from one another and different looking pointers may be generated for each. For example, a touch by the stylus 104 may correlate with a stylus pointer 906 and a touch generated by a finger of the hand 902 may correspond to a finger pointer 908.

Each of the pointers 906 and 908 moves on the display in response to the corresponding objects 104 and 902 moving across the surface of the force-sensitive touch sensor in the tablet 106. Each of the pointers 906 and 908 may interact with objects displayed on the display 900 such as a soft button 910. In this example, the finger pointer 908 is over the soft button 910. When a magnitude of force applied by the hand 902 to the force-sensitive touch sensor exceeds a threshold force then the touch control module 414 may interpret that as a signal to activate a function represented by the soft button 910. Similar to the soft button 500 shown in FIG. 5, the soft button 910 may respond to different levels of force with different functionality. Activation of the soft button 910 by the stylus pointer 906 may generate a different functionality than activation by the finger pointer 908.

Figure 10:
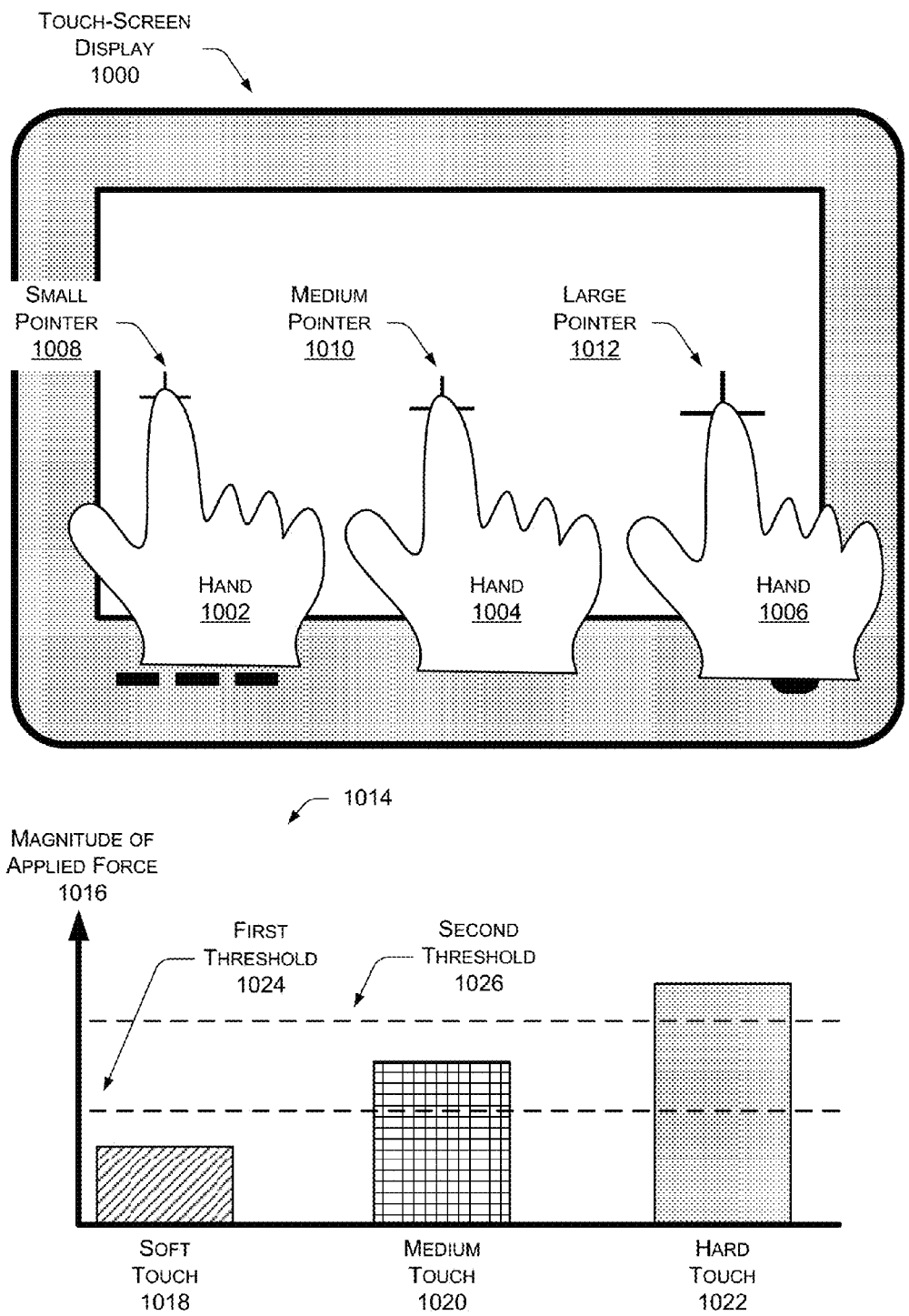
FIG. 10 depicts an illustrative touch-screen display with three different pointer sizes and a graph showing the force of three touches on the touch-screen display.

FIG. 10 shows a force-sensitive touch-screen display 1000 receiving touch input from three hands 1002, 1004, and 1006 and generating corresponding pointers 1008, 1010, and 1012. The three hands 1002, 1004, and 1006 may represent hands of three different users interacting with the touch-screen display 1000 at the same time or a single hand at three different time points. Unlike the tablet 106 and display 900 shown in FIG. 9, here the force-sensitive input sensors are integrated into the display to create the force-sensitive touch-screen display 1000. Because the surface that receives touch input is also the display, it is possible for an object touching the touch sensor to obscure part of the display. To avoid a pointer becoming "lost" beneath a finger touching the display a visual representation of a pointer 1008, 1010, or 1012 may be larger than the size of the contact area of the finger with the display 1000. Although a stylus may not obscure the display to the same degree as a finger, the pointer that corresponds to a stylus may also be scaled based on the contact area.

A graph 1014 shows illustrative magnitudes of applied force 1016 for each of the hands 1002, 1004, and 1006. In this example, the hand 1002 is applying a soft touch 1018 to the touch-screen 1000. The hand 1004 is applying a medium touch 1020 and the hand 1006 is applying a hard touch 1022. A size of the visual representation of the pointer 1008, 1010, or 1012 may also change with the magnitude of force applied to the touch-screen display 1000. The size of the visual representation of the pointer may change as the force applied to the touch-screen display 1000 changes. For example, increasing incident force may cause the pointer to change from the small pointer 1008 to the medium pointer 1010 and then to the large pointer 1012. The change may be continuous so that the size of the pointer smoothly changes as the magnitude of the force changes. In other implementations, the visual representation of the pointer may change size discontinuously switching from one visual representation to another when the magnitude of force exceeds a threshold. One type of change in visual representation is a change in size; however, other changes are also possible such as a change in color or shape of the pointer depending on the amount of incident force. For example, the visual representation of the point may change as the magnitude of force approaches a threshold. As one example, the pointer could be an open circle that fills in with a color as the magnitude of force approaches a threshold and becomes completely filled in at the threshold. This type of visual feedback could alert as user when he or she is close to reaching a threshold magnitude of force. Also, transitioning over a threshold (in any of the implementations discussed herein) may be accompanied by non-visual feedback such as a sound or a haptic response. The graph 1014 shows a first threshold 1024 and a second threshold 1026. In this example, levels of incident force less than the first threshold 1024 such as the soft touch 1018 may be represented by the small pointer 1008. Levels of force above the first threshold 1024 but below the second threshold 1026 may be represented by the medium pointer 1010 and levels of force that exceed the second threshold 1026 may be represented by the large pointer 1012. Although two thresholds and three pointer sizes are shown in this example, any number of thresholds and discrete pointer representations are possible. In some implementations, the number of discrete categories may be so numerous that discontinuous changes in the visual representation of the pointer appear to be continuous.

Illustrative Process of a Generating a Touch Cursor

Figure 11:
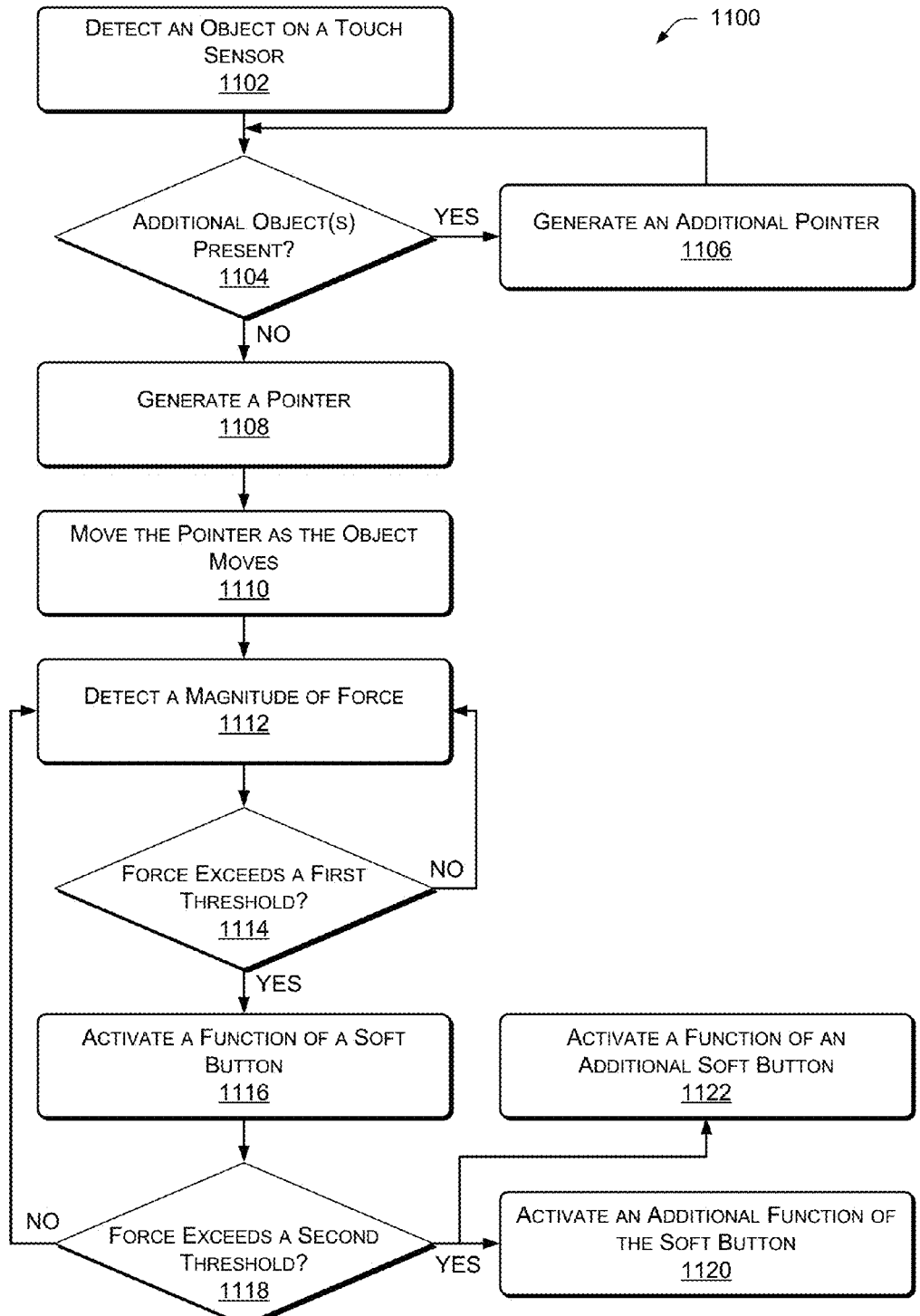
FIG. 11 is an illustrative process of generating a pointer from a touch on a force-sensitive touch sensor and interacting with soft buttons using the pointer.

FIG. 11 illustrates example process 1100 that may be implemented by the architecture of FIG. 1 using the computing device(s) 100 shown in FIGS. 1 and 4 for the use cases shown in FIGS. 9 and 10. This process is illustrated as a collection of blocks in a logical flow graph, which represents a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 1102, an object touching a force-sensitive touch sensor is detected. As discussed previously, the object may be a finger, a stylus, or some other object.

At 1104, any additional objects touching the force-sensitive touch sensor are detected. If an additional object is present (i.e., the "yes" branch at 1104), an additional pointer is generated on the display based on the position of the additional object at 1106. Although not shown, any number of additional objects may be detected and assigned pointers. For example, a user could place all five fingers of one hand onto the force-sensitive touch sensor and five pointers would appear on the display corresponding to the locations of the five fingers on the touch sensor. The detection of additional objects may be repeated until no additional objects are found.

If no more additional objects are present (i.e., the "no" path at 1104), pointer(s) are generated on the display at 1108. The locations of the pointer(s) are based on position(s) of the object(s) touching the force-sensitive touch sensor. The visual representation of the pointer may vary depending on the object that is touching the force-sensitive touch sensor. For example, a pointer generated from a finger touching the touch sensor may be visually different than the pointer generated by a stylus.

At 1110, the pointer(s) may be moved on the display in response to the object(s) moving on the force-sensitive touch sensor. In other words, horizontal and/or vertical movements of the object(s) on the force-sensitive touch sensor may be mirrored by corresponding horizontal and/or vertical movement of the pointer(s) on the display.

At 1112, a magnitude of force generated by the object(s) touching the force-sensitive touch sensor is detected. As shown in FIG. 1, the force may provide Z-axis input in addition to the horizontal and vertical input provided by the force-sensitive touch sensor.

At 1114, it is determined if a magnitude of force generated by the object(s) touching the force-sensitive touch sensor exceeds a first threshold level of force. This first threshold may be similar to the low threshold 318 shown in FIG. 3. As discussed above with respect to FIG. 3, the threshold may be absolute or relative. If the magnitude of force does not exceed the threshold (i.e., the "no" branch at 1114), the magnitude of force continues to be monitored at 1112. The cycle may be repeated until the magnitude of force exceeds the first threshold.

If the magnitude of force exceeds the first threshold (i.e., the "yes" path at 1114), a function of a soft button underneath the pointer is activated at 1116. The activation of the soft button may be similar to that shown in FIGS. 3, 5, and/or 9.

At 1118, it is determined if the force applied to the force-sensitive touch sensor exceeds a second threshold. The second threshold may be similar to the high threshold 320 shown in FIG. 3. If the amount of force does not exceed this second threshold (i.e., the "no" path from 1118), the magnitude of force continues to be monitored at 1112.

When the amount of force exceeds the second threshold (i.e., the "yes" branch from 1118), there are various response that may be implemented. Two possible responses are shown. One possible response is to activate an additional function of the soft button at 1120. As discussed above, a given soft button may have multiple functions assigned to it depending on the level of force applied to the touch-sensitive touch sensor. In another possible response, a function of an additional soft button located at a different point on a display than the first soft button may be activated by the force that exceeds the second threshold at 1122. For example, the display may present a user interface with multiple soft buttons that respond to different levels of force. The operation at 1122 represents pressing on a portion of the force-sensitive touch sensor that corresponds to a soft button requiring a "hard" touch to activate.

Illustrative Three-dimensional Object Manipulation Techniques

All of the displays discussed previously (e.g., the touch-screen display 102, the display 418, the display 900, the touch-screen display 1000) are two-dimensional displays capable of displaying representations of three-dimensional objects. The force-sensitive touch sensor by measuring both gestures along X- and Y-axis as well as pressure differentials to determine a Z-axis provides an input device that allows for intuitive manipulation of representations of three-dimensional objects. Various combinations of multiple touches including isotonic operations and/or isometric operations may be interpreted, for example, by the touch control module 414 as commands to alter the display of a three-dimensional object. Many touch combinations may be initiated by using two or more fingers of the hand to change the display of the three-dimensional object. Although show in the following figures as a user interacting with a touch-screen display, the user could also interact "indirectly" with the three-dimensional object by using a touch sensitive tablet and viewing his or her touches represented as pointers on a display.

Figure 12:
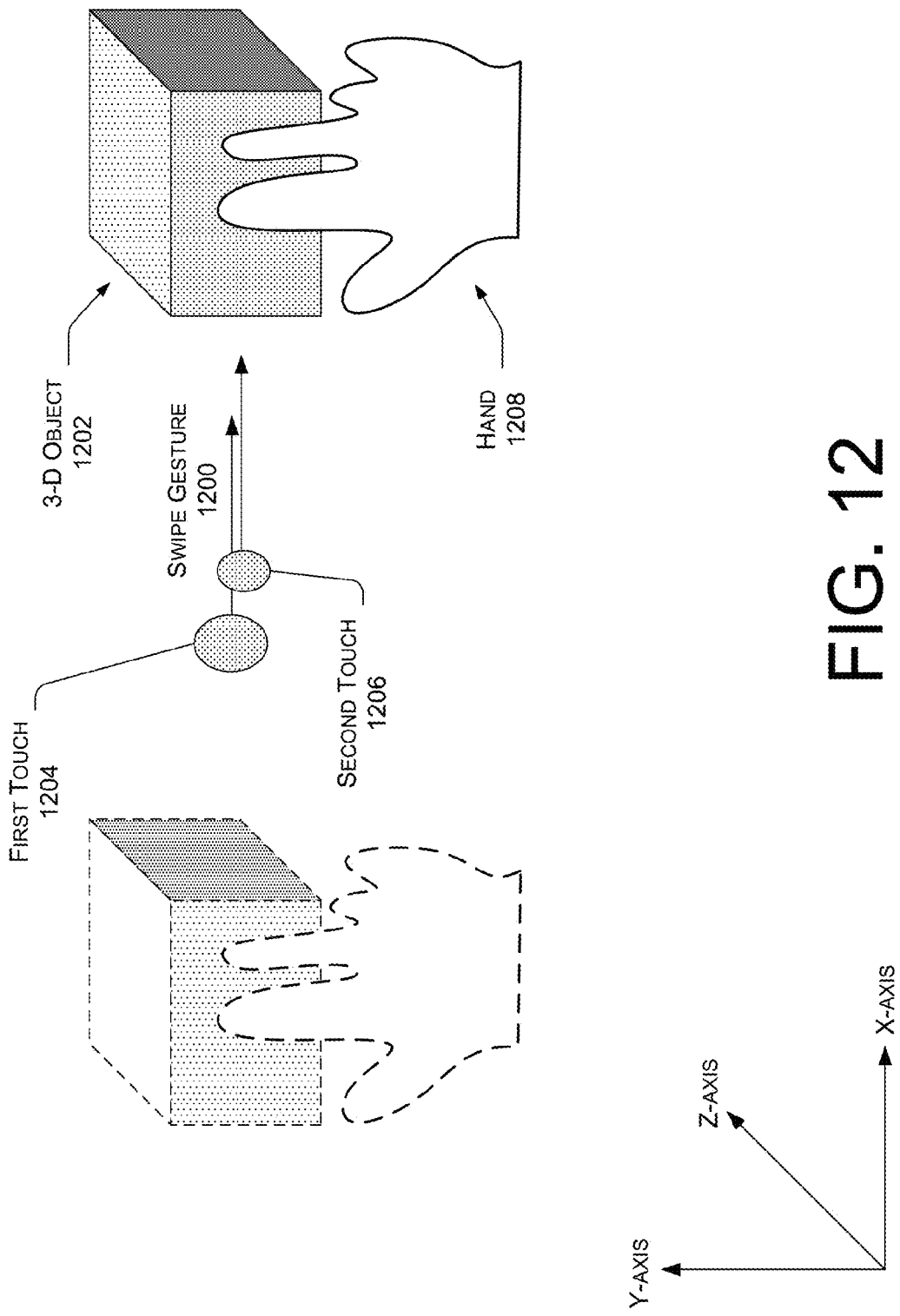
FIG. 12 shows a swipe gesture moving a three-dimensional object.

FIG. 12 shows a swipe gesture 1200 changing the display of a three-dimensional object 1202. The swipe gesture 1200 is initiated by one or more touches on the force-sensitive touch sensor followed by a swiping or sliding gesture across the surface of the touch sensor. In this example, two contact points are made with the touch sensor represented here by a first touch 1204 and a second touch 1206. The first touch 1204 and the second touch 1206 may be generated by the index and middle fingers of a user's hand 1208. In some implementations, the force of the first and second touches 1204 and 1206 must exceed a threshold level of force before the swipe gesture 1200 is initiated. A level of force may be determined independently for the first touch 1204 and the second touch 1206 and, in some implementations, the swipe gesture 1200 may be initiated when the force of the touches 1204 and 1206 either each individually or in total exceeds the threshold level. Thus, if the level of applied force is low the user may pass his or her hand 1208 over the three-dimensional object 1202 without initiating the swipe gesture 1200. Here, as the hand 1208 moves in a generally horizontal direction to the right, the representation of the three-dimensional object 1202 is also moved to the right on the display. Movement is not, of course, limited to only horizontal. The three-dimensional object 1202 may be moved along a plane parallel to the two-dimensional display in the same direction as the swipe gesture 1200 thus naturally tracking the movement of the user's hand 1208. The swipe gesture 1200 may move the three-dimensional object 1202 in any direction along the X-axis or Y-axis shown in FIG. 12.

Figure 13:
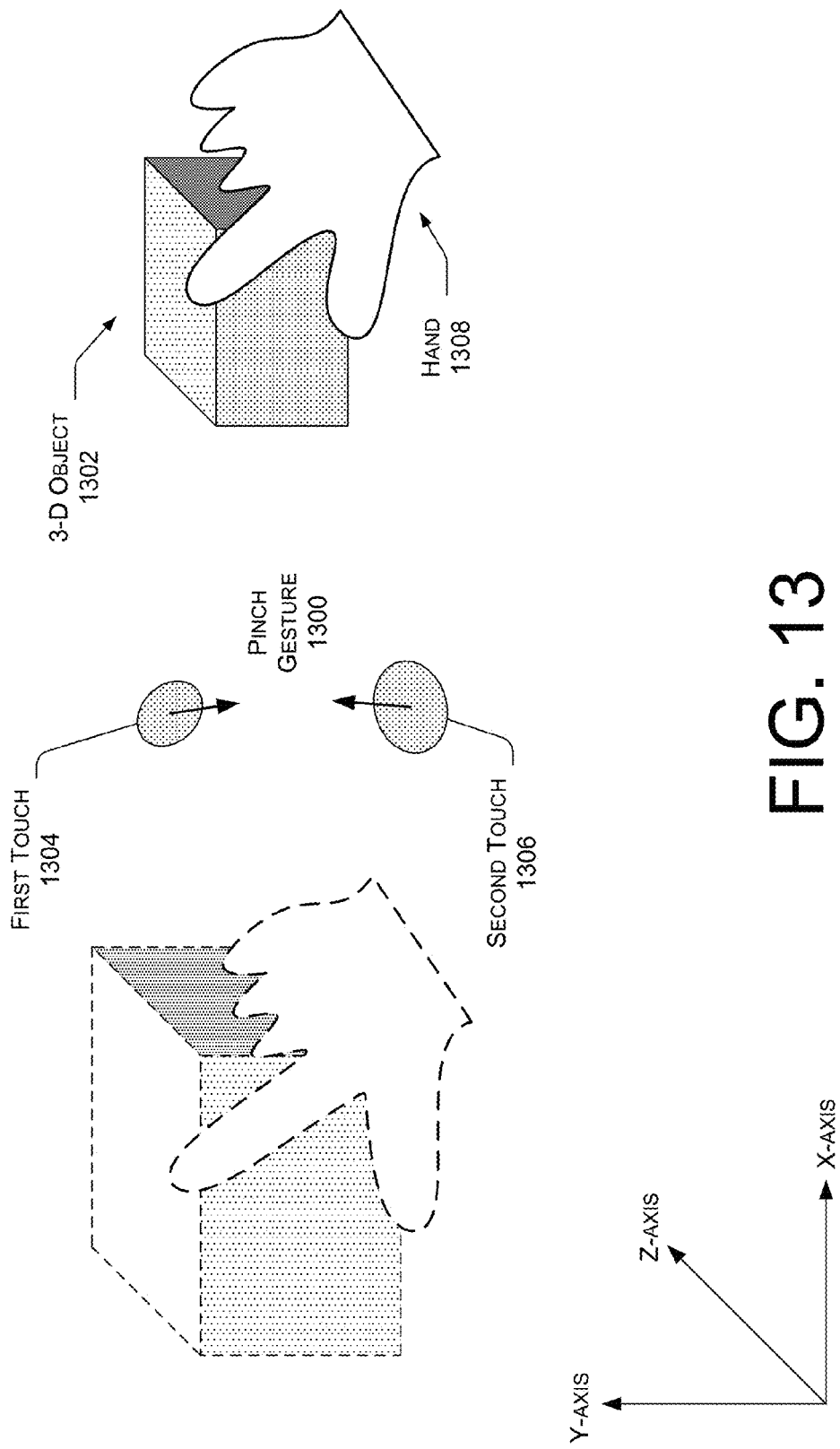
FIG. 13 shows a pinch gesture making a three-dimensional object appear to move away from a surface of a display.

FIG. 13 shows a pinch gesture 1300 changing the display of a three-dimensional object 1302. The pinch gesture 1300 may be created by a plurality of contact areas on the force-sensitive touch sensor represented by a first touch 1304 and a second touch 1306 moving closer together. The first touch 1304 and the second touch 1306 may be created by an index finger and a thumb of a user's hand 1308 contacting the force-sensitive touch sensor. In some implementations, the force of the first and second touches 1304 and 1306 must exceed a threshold level of force before the pinch gesture 1300 is initiated. The level of force may be determined independently for the first and second touches 1304 and 1306 and, in some implementations, the pinch gesture 1300 may be initiated when the force of the touches 1304 and 1306 either each individually or in total exceeds the threshold level. When the first touch 1304 and the second touch 1306 move closer together the representation of the three-dimensional object 1302 changes so that the object 1302 appears farther from a surface of the display or alternatively decreases the scale of the object 1302. In other words, it appears as if the three-dimensional object 1302 moves backwards away from the display screen. Thus, the pinch gesture 1300 moves the three-dimensional object 1302 along the z-axis in a direction away from the screen.

Figure 14:
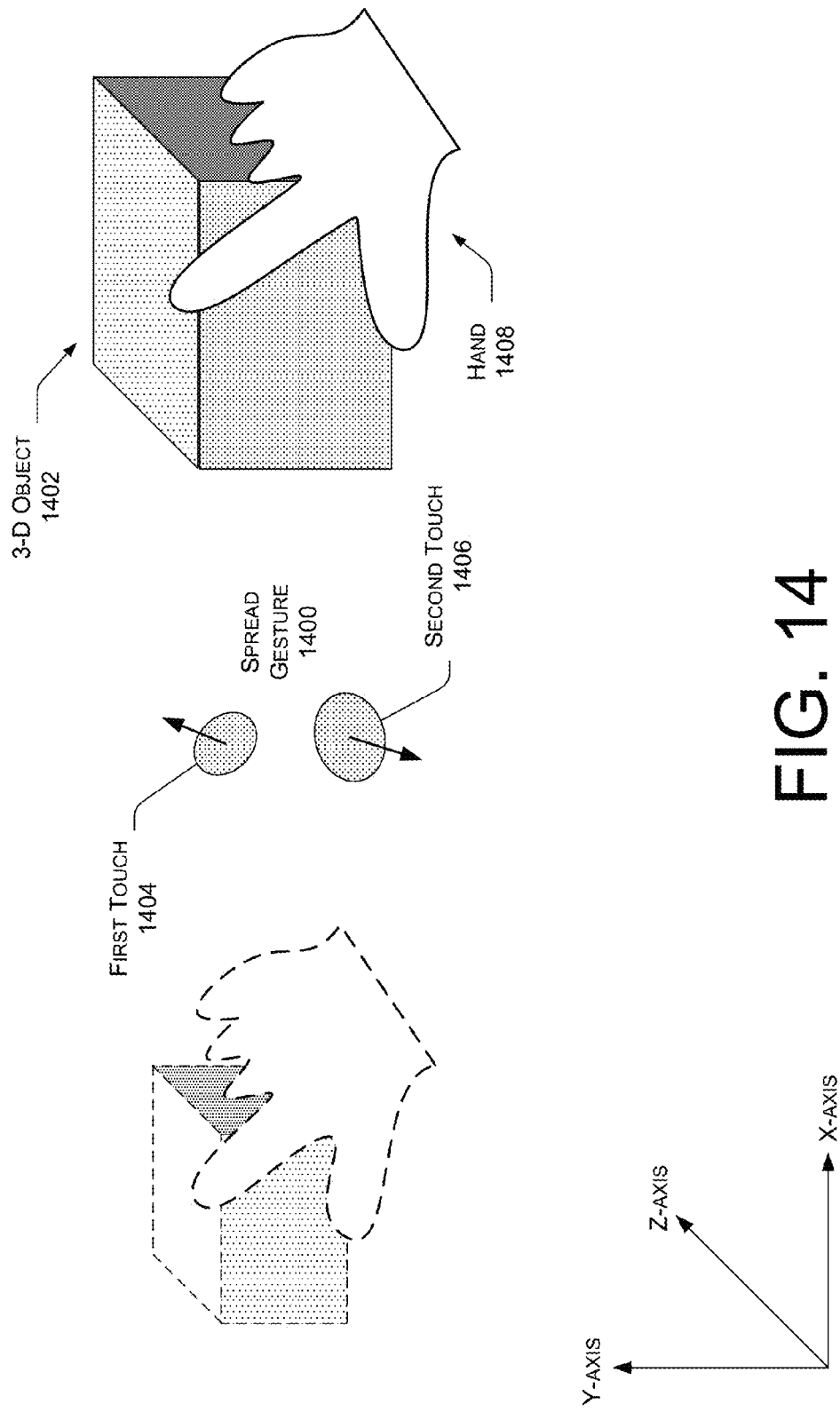
FIG. 14 shows a spread gesture making a three-dimensional object appear to move towards a surface of a display.

FIG. 14 shows a spread gesture 1400 changing the display of a three-dimensional object 1402. The spread gesture 1400 may be thought of as the converse to the pinch gesture 1300. A plurality of touches, here a first touch 1404 and a second touch 1406, are made on the force-sensitive touch sensor. The first touch 1404 and the second touch 1406 may be made by an index finger and a thumb of the user's hand 1408. In some implementations, the force of the first and second touches 1404 and 1406 must exceed a threshold level of force before the spread gesture 1400 is initiated. The level of force may be determined independently for the first and second touches 1404 and 1406 and, in some implementations, the spread gesture 1400 may be initiated when the force of the touches 1404 and 1406 either each individually or in total exceeds the threshold level. As the index finger and the thumb spread apart the first touch 1404 and the second touch 1406 move farther apart on the force-sensitive touch sensor. In response to the spreading of the two (or more) touches the representation of the three-dimensional object 1402 is changed so that the three-dimensional object 1402 appears to move closer to the surface of the display or alternatively increases the scale of the object 1402. In other words, the spread gesture 1400 causes the three-dimensional object 1402 to appear to move along the Z-axis in a direction towards the screen.

Figure 15:
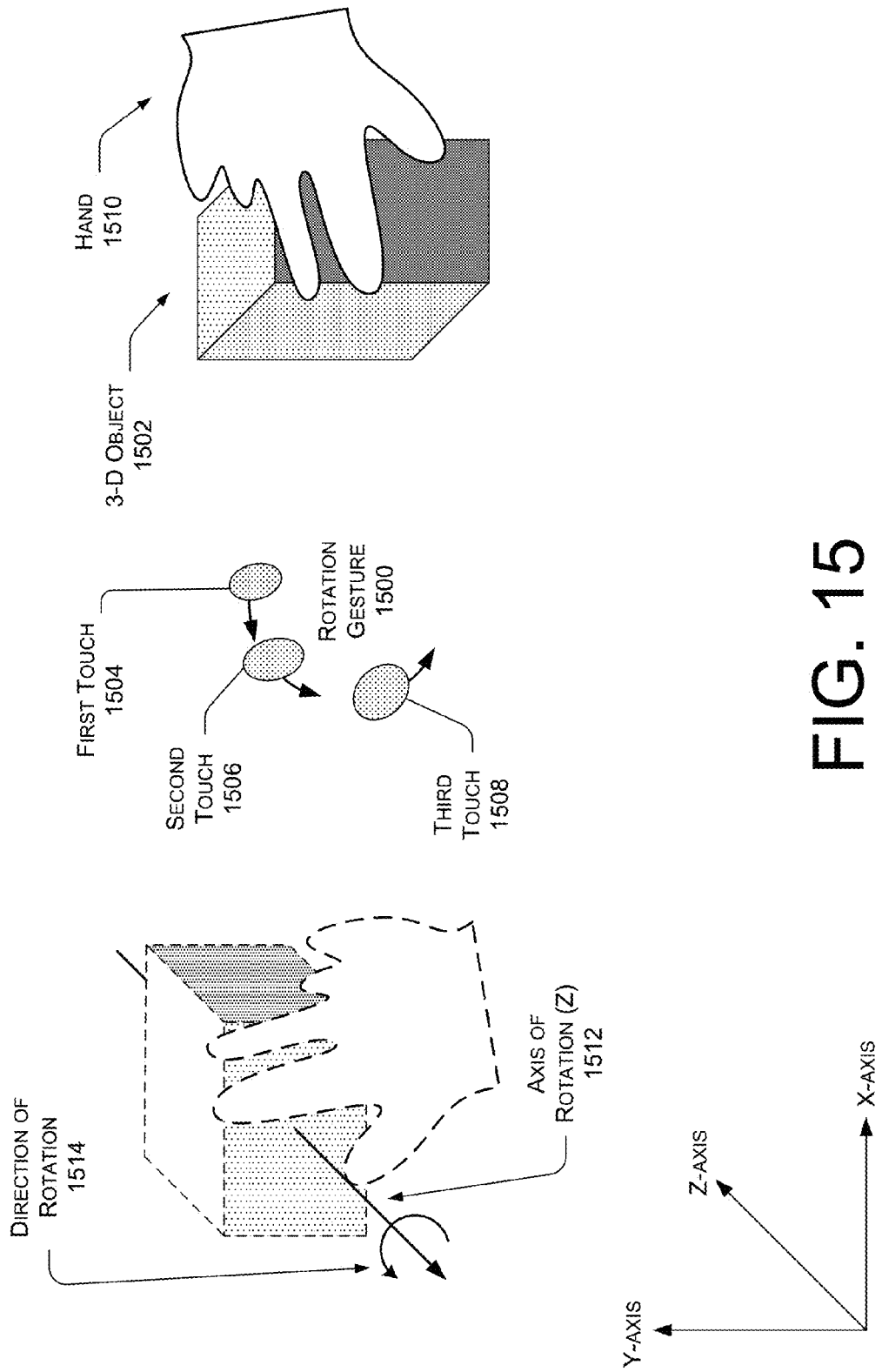
FIG. 15 shows a rotation gesture rotating the orientation of a three-dimensional object about a z-axis.

FIG. 15 shows a rotation gesture 1500 changing the display of a three-dimensional object 1502. The rotation gesture 1500 may be formed by multiple touches such as, for example, three touches represented here as a first touch 1504, a second touch 1506, and a third touch 1508. The touches may be generated by a middle finger, an index finger, and a thumb of the user's hand 1510. In this illustration, a shape defined by the three contact points of the first, second, and third touches 1504, 1506, and 1508 rotates on the force-sensitive touch sensor in a counterclockwise direction. In some implementations, the force of the multiple touches must 1504, 1506, and 1508 exceed a threshold level of force before the rotation gesture 1500 is initiated. The level of force may be determined independently for each of the touches 1504, 1506, and 1508 and, in some implementations, the rotation gesture 1500 may be initiated when the force of the touches 1504, 1506, and 1508 either each individually or in total exceeds the threshold level. In response to the rotation, the display changes to show the three-dimensional object 1502 rotating around an axis of rotation 1512 that is a normal of a plane defined by the two-dimensional display. The direction of rotation 1514 around the axis of rotation 1512 is the same as the direction in which the first, second, and third touches 1504, 1506, and 1508 rotate. The axis of rotation 1512 is the z-axis in this illustration. Thus, the rotation gesture 1500 may change the display of the three-dimensional object 1502 so that it appears to rotate either clockwise or counterclockwise around the z-axis.

Figure 16:
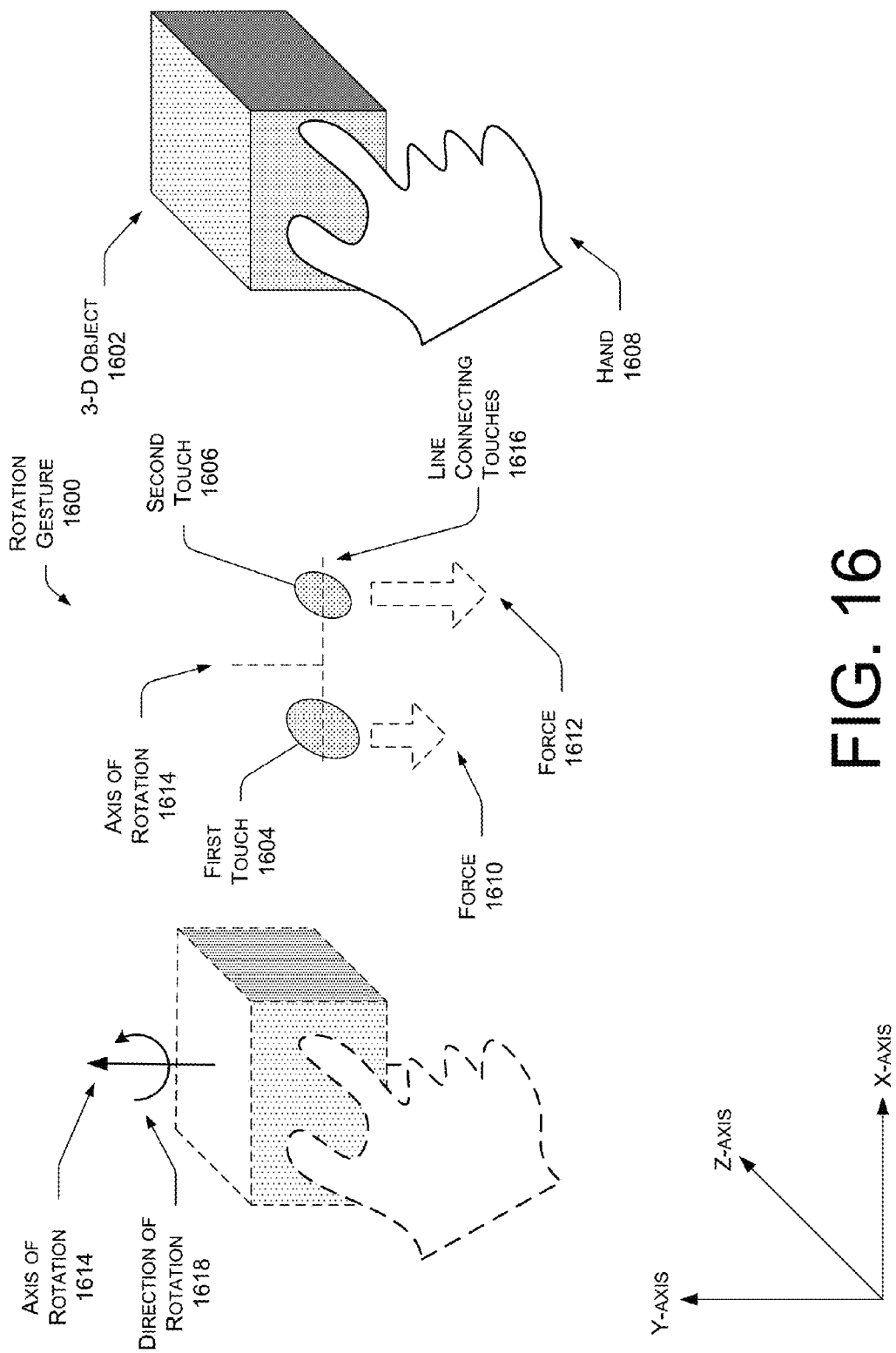
FIG. 16 shows a change in force applied between two touches rotating the orientation of a three-dimensional object about a y-axis.

FIG. 16 shows a different type of rotation gesture 1600 changing the display of a three-dimensional object 1602. The rotation gesture 1600 may be formed by a plurality of touching having different force levels. A first touch 1604 and a second touch 1606 may be generated by a thumb and index finger of the user's hand 1608. Detecting a difference in the magnitude of force applied by the first touch 1604 and the second touch 1606 may cause the display to show the three-dimensional object 1602 rotating. In this example, the amount of force 1610 applied by the first touch 1604 is less than the amount of force 1612 applied by the second touch 1606. Here, the force differential between the first touch 1604 and the second touch 1606 causes the representation of the three-dimensional object 1602 to rotate along an axis 1614 parallel to the display and perpendicular to a line 1616 connecting the first touch 1604 with the second touch 1606. When looking down from the top of the three-dimensional object 1602 the direction of rotation 1618 is counterclockwise. Thus, in this example the three-dimensional object would appear to rotate towards to the right because the second touch 1606 has a greater magnitude of force 1612 than the first touch 1604. With this interface, the axis of rotation 1614 can be easily altered by changing the placement of the first touch 1604 and the second touch 1606 and thus the orientation of the line connecting the touches 1616.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
one or more processors;
a memory coupled to the one or more processors;
an input/output interface coupled to the one or more processors configured to receive input from a force-sensitive touch sensor and send output to a display; and
a touch control module stored in the memory and configured to execute on the one or more processors to:
recognize touches at a first contact point and a second contact point on the force-sensitive touch sensor;
determine a magnitude of force applied at the first contact point;
determine a magnitude of force applied at the second contact point;
determine a difference between the magnitude of force applied at the first contact point and the magnitude of force applied at the second contact point;
identify an isometric operation, wherein the isometric operation is an operation in which the determined difference between the magnitude of force applied at the first contact point and the magnitude of force applied at the second contact point is greater than a threshold while a location of the at least one of the first contact point or the second contact point remains substantially the same, the threshold being based at least in part on at least one of the determined magnitude of force applied at the first contact point or the determined magnitude of force applied at the second contact point;
identify an isotonic operation, wherein the isotonic operation is an operation in which a location of at least one of the first contact point or the second contact point changes while the determined difference between the magnitude of force applied at the first contact point and the magnitude of the force applied at the second contact point is less than the threshold;
interpret the isometric operation as a first mode of input; and
interpret the isotonic operation as a second mode of input.

2. The device of claim 1, wherein the force-sensitive touch sensor and the display comprise a force-sensitive touch-screen display.

3. The device of claim 1, wherein the force-sensitive touch sensor comprises an interpolating force-sensitive resistance array.

4. The device of claim 1, wherein the touch control module is further configured to execute on the one or more processors to, upon detection of the isotonic operation, temporarily suspend interpretation of isometric operations.

5. The device of claim 1, wherein the touch control module is further configured to execute on the one or more processors to:
determine a surface area on the force-sensitive touch sensor for the first contact point and the second contact point;
determine, for each of the touches, a type of object contacting the first contact point and the second contact point on the force-sensitive touch sensor.

6. The device of claim 5, wherein the type of object contacting the first contact point or the second contact point on the force-sensitive touch sensor comprises at least one of a finger or a stylus.

7. The device of claim 1, wherein the touch control module is further configured to execute on the one or more processors to interpret the first mode of input as selection of an item and interpret the second mode of input as assigning a value to the item.

8. The device of claim 7, wherein the selection of the item comprises selecting the item from a list of items and a change in isometric operations scrolls through the list of items.

9. The device of claim 1, wherein the touch control module is further configured to execute on the one or more processors to interpret the first mode of input as selecting of an item in response to the magnitude of force exceeding a threshold magnitude and interpret the second mode of input as moving of the item on the display.

10. The device of claim 9, wherein the touch control module is further configured to execute on the one or more processors to modify a functionality of the item in response to moving the item to contact another item on the display.

11. The device of claim 10, wherein the modified functionality of the item is provided as a command to the one or more processors in response to the force ceasing.

12. The device of claim 1, the touch control module further configured to execute on the one or more processors to:
 detect a touch applied to a first area of the force-sensitive touch sensor and to a second area of the force-sensitive touch sensor, wherein a contact area of an object generating the touch overlaps in part with the first area and overlaps in part with the second area;
 compare a magnitude of force applied to the first area to a magnitude of force applied to the second area;
 initiate a first command in response to determining the magnitude of force applied to the first area is greater; and
 initiate a second command in response to determining the magnitude of force applied to the second area is greater.

13. The device of claim 1, the touch control module further configured to execute on the one or more processors to:
 detect an object touching the force-sensitive touch sensor;
 generate a pointer on the display, a location of the pointer on the display based at least in part on a position of the object on the force-sensitive touch sensor;
 alter the location of the pointer on the display in response to the object moving on the force-sensitive touch sensor;
 detect a magnitude of force generated by the object touching the force-sensitive touch sensor; and
 activate a function represented by a soft button underneath the pointer in response to detecting that the magnitude of force exceeds a threshold force.

14. The device of claim 1, the touch control module further configured to execute on the one or more processors to:
 generate a representation of a three-dimensional object on the display;
 recognize a plurality of touches on the force-sensitive touch sensor;
 detect a magnitude of force generated by each of the plurality of touches; and
 alter the display of the three-dimensional object responsive to the plurality of touches and the magnitude of force associated with each of the plurality of touches.

15. One or more non-transitory computer-readable storage media storing instructions that, when executed by one or more processors coupled to an input/output interface configured to receive input from a force-sensitive touch sensor and send output to a display, cause the one or more processors to perform acts comprising:
 receiving input indicating that isotonic operations should not be identified;
 recognizing touches at a first contact point and at a second contact point on the force-sensitive touch sensor;
 determining a magnitude of force applied at the first contact point;
 determining a magnitude of force applied at the second contact point, wherein the magnitude of force applied at the first contact point is different than the magnitude of force applied at the second contact point;
 determining that the magnitude of force applied at the first contact point varies from the magnitude of force applied at the second contact point by at least a predetermined amount;
 determining that a location of at least one of the first contact point or the second contact point remains substantially the same;
 identifying an isometric operation; and
 interpreting the isometric operation as a first mode of input.

16. The one or more non-transitory computer-readable storage media of claim 15, the acts further comprising:
 detecting a touch applied to a first area of the force-sensitive touch sensor and to a second area of the force-sensitive touch sensor, wherein a contact area of an object generating the touch overlaps in part with the first area and overlaps in part with the second area;
 comparing a magnitude of force applied to the first area to a magnitude of force applied to the second area;
 initiating a first command in response to determining the magnitude of force applied to the first area is greater; and
 initiating a second command in response to determining the magnitude of force applied to the second area is greater.

17. The one or more non-transitory computer-readable storage media of claim 15, the acts further comprising:
 in response to interpreting that a particular operation is an isometric operation and a detected touch corresponding to the particular operation is a detected touch applied to a first area of the force-sensitive touch sensor and to a second area of the force-sensitive touch sensor, wherein a contact area of an object generating the detected touch overlaps in part with the first area and overlaps in part with the second area:
 comparing a magnitude of force applied to the first area to a magnitude of force applied to the second area;
 initiating a first command in response to determining the magnitude of force applied to the first area is greater; and
 initiating a second command in response to determining the magnitude of force applied to the second area is greater.

18. The one or more non-transitory computer-readable storage media of claim 15, wherein the force-sensitive touch sensor comprises a force-sensitive touch-screen display.

19. The one or more non-transitory computer-readable storage media of claim 15, wherein the force-sensitive touch sensor comprises an interpolating force-sensitive resistance array.

20. The one or more non-transitory computer-readable storage media of claim 15, wherein the force-sensitive touch sensor generates anti-aliased images of pressure.

21. The one or more non-transitory computer-readable storage media of claim 16, wherein the first area and the second area respond to isometric inputs and do not respond to isotonic inputs.

22. The one or more non-transitory computer-readable storage media of claim 16, wherein the second area is adjacent to the first area.

23. The one or more non-transitory computer-readable storage media of claim 16, wherein the second area is within about 5 mm of the first area.

24. The one or more non-transitory computer-readable storage media of claim 16 wherein the touch is applied by a finger and the magnitude of force applied to the first area relative to the magnitude of force applied to the second area varies based at least in part upon an angle at which the finger contacts the force-sensitive touch sensor.

25. The one or more non-transitory computer-readable storage media of claim 16, wherein the first command comprises increasing a value and the second command comprises decreasing the value.

26. The one or more non-transitory computer-readable storage media of claim 25, wherein a rate at which the value increases depends at least in part on the magnitude of force applied to the first area and a rate at which the value decreases depends at least in part on the magnitude of force applied to the second area.

27. The one or more non-transitory computer-readable storage media of claim 25, wherein the value comprises a pitch of a musical note.

28. The one or more non-transitory computer-readable storage media of claim 16, the acts further comprising:
    detecting the touch applied to a third area of the touch sensor and to a fourth area of the touch sensor in addition to the first and second areas of the touch sensor;
    comparing a magnitude of force applied to the first, second, third, and fourth areas; initiating a third command in response to determining the magnitude of force applied to the third area is greatest; and
    initiating a fourth command in response to determining the magnitude of force applied to the fourth area is greatest.

29. The one or more non-transitory computer-readable storage media of claim 28, wherein the first, second, third, and fourth areas are adjacent.

30. The one or more non-transitory computer-readable storage media of claim 28, wherein each of the first, second, third, and fourth areas are within 5 mm of the other of the first, second, third, and fourth areas.

31. The one or more non-transitory computer-readable storage media of claim 28, wherein a line bisecting the first and second areas is perpendicular to a line bisecting the third and fourth areas.

32. The one or more non-transitory computer-readable storage media of claim 28, wherein the first command comprises moving a vertical scroll bar up, the second command comprises moving the vertical scroll bar down, the third command comprises moving a horizontal scroll bar left, and the fourth command comprises moving the horizontal scroll bar right.

33. The one or more non-transitory computer-readable storage media of claim 15, the acts further comprising
    generating a representation of a three-dimensional object on the display; and
    altering the display of the three-dimensional object responsive to the one or more touches and the magnitude of force associated with each of the one or more of touches.

34. The one or more non-transitory computer-readable storage media of claim 33, the acts further comprising detecting a swipe gesture initiated by the magnitude of force associated with the touches exceeding a threshold force and, responsive to the swipe gesture, moving the representation of the three-dimensional object along a plane parallel to the display in a same direction as the swipe gesture.

35. The one or more non-transitory computer-readable storage media of claim 34, wherein the magnitude of force for each of the plurality of touches exceeds the threshold force.

36. The one or more non-transitory computer-readable storage media of claim 34, wherein a total magnitude of force of the plurality of touches exceeds the threshold force.

37. The one or more non-transitory computer-readable storage media of claim 33, the acts further comprising detecting a pinch gesture initiated by the magnitude of force associated with the touches exceeding a threshold force, wherein the plurality of touches move closer together and, responsive to the pinch gesture, moving the representation of the three-dimensional object so that the three-dimensional object appears farther from the display.

38. The one or more non-transitory computer-readable storage media of claim 33, the acts further comprising detecting a spread gesture initiated by the magnitude of force associated with the touches exceeding a threshold force, wherein the plurality of touches move farther apart and, responsive to the spread gesture, moving the representation of the three-dimensional object so that the three-dimensional object appears closer to the display.

39. The one or more non-transitory computer-readable storage media of claim 33, the acts further comprising detecting a multi-touch rotation gesture initiated by the magnitude of force associated with the touches exceeding a threshold force, wherein a shape defined by the contact points of the plurality of touches rotates on the force-sensitive touch sensor and, responsive to the rotation, the representation of the three-dimensional object rotates around an axis that is a normal of a plane defined by the display.

40. The one or more non-transitory computer-readable storage media of claim 33, the acts further comprising:
    detecting a differential in a magnitude of force by a first of the plurality of touches and a second of the plurality of touches; and
    rotating the representation of the three-dimensional object along an axis parallel to the display and perpendicular to a line connecting a location of the first of the plurality of touches with the second of the plurality of touches, wherein the three-dimensional object is rotated towards the one of the plurality of touches having a greater magnitude of force.

41. The one or more non-transitory computer-readable storage media of claim 15, wherein the input is a first input, and the acts further comprising:
    receiving a second input indicating that isometric operations should not be identified;
    determining at least one of that a location of the first contact point has changed by more than a threshold or a location of the second contact point has changed by more than the threshold;
    determining that magnitude of force applied at the first contact point and the magnitude of force applied at the second contact point does not vary by more than the predetermined amount;
    identifying an isotonic operation; and
    interpreting the isotonic operation as a second mode of input.

42. A computer-implemented method comprising:
    performing the following under control of computing device comprising one or more processors coupled to an input/output interface configured to receive input from a force-sensitive touch sensor and send output to a display, the computing device configured with executable instructions: recognizing touches at one or more contact points on the force-sensitive touch sensor;
determining a magnitude of force applied at each of the contact points, wherein the magnitude of force is determined to be a light touch if it is below a first force threshold, a medium touch if it is above the first force threshold but below a second force threshold, or a hard touch if it is above the second force threshold, at least one of the force thresholds being determined based at least in part on a determined magnitude of force applied to at least one contact point;
determining changes in the location or changes in the magnitude of force;
identify an isometric operation, wherein the isometric operation is an operation comprising any combination of a light touch, a medium touch, or a hard touch; and
identify an isotonic operation, wherein the isotonic operation is an operation in which a location of at least one of the contact points changes.

43. The computer-implemented method of claim 42, further comprising:
detecting an object touching a force-sensitive touch sensor;
generating a pointer on the display, a location of the pointer on the display based at least in part on a position of the object on the force-sensitive touch sensor;
altering the location of the pointer on the display in response to the object moving on the force-sensitive touch sensor;
detecting a magnitude of force generated by the object touching the force-sensitive touch sensor; and
activating a function represented by a soft button underneath the pointer in response to detecting that the magnitude of force exceeds at least the first force threshold.

44. The computer-implemented method of claim 42, further comprising:
detecting a touch of an object on a force-sensitive touch sensor;
generating a pointer on the display, a location of the pointer on the display based at least in part on a position of the detected touch of the object on the force-sensitive touch sensor;
in response to identifying that a first particular operation is an isotonic operation corresponding to the detected touch of the object moving on the force-sensitive touch sensor:
altering the location of the pointer on the display in response to the object moving on the force-sensitive touch sensor;
during or subsequent to the moving of the detected touch of the object on the force-sensitive touch sensor or in response to identifying that a second particular operation is an isometric operation corresponding to the detected touch of the object:
detecting a magnitude of force generated by the detected touch of the object touching the force-sensitive touch sensor; and
activating a function represented by a soft button underneath the pointer in response to detecting that the magnitude of force exceeds at least the first force threshold.

45. The computer-implemented method of claim 43, wherein generating a pointer comprises creating a first visual representation of the pointer in response to determining the object comprises a finger and creating a second visual representation of the pointer in response to determining the object comprises a stylus.

46. The computer-implemented method of claim 43, wherein detecting the object comprises sensing the object using an interpolating force-sensitive resistance array.

47. The computer-implemented method of claim 43, wherein generating the pointer on the display comprises generating a visual representation of the pointer that changes continuously as the magnitude of the force changes.

48. The computer-implemented method of claim 43, wherein generating the pointer on the display comprises generating a visual representation of the pointer that changes discontinuously as the magnitude of the force changes, the change in the visual representation of the pointer occurring in response to the magnitude of the force varying between at least one of the light touch and the medium touch or the medium touch and the hard touch.

49. The computer-implemented method of claim 48, wherein generating the pointer on the display comprises generating first visual representation in response to detecting that the magnitude of the force is below the first force threshold and a second visual representation in response to detecting that the magnitude of the force is above the first force threshold.

50. The computer-implemented method of claim 43, further comprising activating an additional function represented by the soft button in response to detecting that the magnitude of force exceeds the second force threshold.

51. The computer-implemented method of claim 43, further comprising:
detecting an additional object touching the force-sensitive touch sensor;
generating an additional pointer on the display based at least in part on a position of the additional object on the force-sensitive touch sensor;
altering a location of the additional pointer on the display in response to the additional object moving on the force-sensitive touch sensor; and
detecting a magnitude of force generated by the additional object touching the force-sensitive touch sensor.

52. The computer-implemented method of claim 51, wherein the object comprises a finger of a first user and the additional object comprises a finger of a second user.

53. The computer-implemented method of claim 51, wherein the object comprises a finger and the additional object comprises a stylus.

54. The computer-implemented method of claim 51, wherein a visual representation of the pointer and a visual representation of the additional pointer are different.

55. A device comprising:
one or more processors;
a memory coupled to the one or more processors;
an input/output interface coupled to the one or more processors configured to receive input from a force-sensitive touch sensor; and
a touch control module stored in the memory and configured to execute on the one or more processors to:
detect touches at a first contact point and a second contact point on the force-sensitive touch sensor;
determine a magnitude of force applied at the first contact point;
determine a magnitude of force applied at the second contact point;
determine a difference between the magnitude of force applied at the first contact point and the magnitude of force applied at the second contact point:
identify a first type of operation, the first type of operation is an operation where the difference between the magnitude of force applied at the first contact point and the magnitude of force applied at the second contact point exceeds a threshold, the threshold being based at least in part on at least one of the determined magnitude of force applied at the first contact point or the determined magnitude of force applied at the second contact point; and
identify a second type of operation, the second type of operation is an operation where the location of at least one of the first contact point or the second contact point changes on the force-sensitive touch sensor while the difference between the magnitude of the force applied at the first contact point and the magnitude of the force applied at the second contact point is below the threshold.

* * * * *